US008740450B2

(12) United States Patent
Mogami et al.

(10) Patent No.: US 8,740,450 B2
(45) Date of Patent: Jun. 3, 2014

(54) STATIC FLUID MIXER CAPABLE OF ULTRAFINELY MIXING FLUIDS

(75) Inventors: Kenichi Mogami, Kitakyushu (JP); Hidehiro Kumazawa, Nagoya (JP)

(73) Assignees: MG Grow Up Corp., Fukuoka (JP); Marufukusuisan Corp., Fukuoka (JP)

( * ) Notice: Subject to any disclaimer, the term of this patent is extended or adjusted under 35 U.S.C. 154(b) by 987 days.

(21) Appl. No.: 12/811,969

(22) PCT Filed: Jan. 9, 2009

(86) PCT No.: PCT/JP2009/050250
§ 371 (c)(1),
(2), (4) Date: Jul. 7, 2010

(87) PCT Pub. No.: WO2009/088085
PCT Pub. Date: Jul. 16, 2009

(65) Prior Publication Data
US 2010/0276820 A1  Nov. 4, 2010

(30) Foreign Application Priority Data
Jan. 10, 2008 (JP) ................................. 2008-003677

(51) Int. Cl.
  *B01F 5/06* (2006.01)
(52) U.S. Cl.
  USPC .......................................................... 366/340
(58) Field of Classification Search
  USPC ....................................... 366/181.5, 336–341
  See application file for complete search history.

(56) References Cited

U.S. PATENT DOCUMENTS

| 3,526,391 | A | * | 9/1970 | Church, Jr. ..................... 366/340 |
| 3,856,270 | A | * | 12/1974 | Hemker ......................... 366/340 |
| 4,207,202 | A | * | 6/1980 | Cole, Jr. .......................... 261/28 |
| 4,501,501 | A | * | 2/1985 | Edwards ........................ 366/336 |
| 4,854,721 | A | * | 8/1989 | Hume ............................ 366/340 |
| 4,869,849 | A | * | 9/1989 | Hirose et al. .................. 261/78.2 |
| 5,327,941 | A | * | 7/1994 | Bitsakis et al. .................. 138/42 |
| 5,356,565 | A | * | 10/1994 | Southwell ....................... 516/10 |
| 5,535,175 | A | * | 7/1996 | Niimi ............................ 366/336 |
| 5,843,385 | A | * | 12/1998 | Dugan .......................... 422/602 |

(Continued)

FOREIGN PATENT DOCUMENTS

| EP | 1036588 A1 * | 9/2000 | ............... B01F 5/06 |
| EP | 1 134 020 | 9/2001 | |

(Continued)

*Primary Examiner* — Charles E Cooley
(74) *Attorney, Agent, or Firm* — Jordan and Hamburg LLP

(57) ABSTRACT

A static fluid mixer which can perform processing such as generation of ultrafine uniform bubbles and has small pressure loss. A static fluid mixer has mixing units having outflow openings for allowing fluid having passed through mixing flow paths to flow through the outflow openings. The mixing units are arranged in a tubular casing body at intervals in the axis direction of the casing body. Adjacent mixing units and the casing body form a flow path forming space. Each mixing unit has an annular outflow path communicating with the end of each mixing flow path. The annular outflow path is open in a ring-like form having a substantially constant width along the entire circumference. The opening at the end of the annular outflow path functions as an outflow opening connecting to the flow path forming space. In the outflow path forming space is formed a collection flow path into which liquid having passed through the mixing flow path collects after flowing from the entire circumference of the outflow opening which is open in the ring-like form and moving toward the axis of the casing body.

9 Claims, 26 Drawing Sheets

(56) References Cited

U.S. PATENT DOCUMENTS

| | | | |
|---|---|---|---|
| 5,887,977 A * | 3/1999 | Morikawa | 366/340 |
| 5,904,807 A * | 5/1999 | Ramm-Schmidt et al. | 159/43.1 |
| 5,935,489 A * | 8/1999 | Hershkowitz et al. | 252/373 |
| 6,132,079 A * | 10/2000 | King | 366/181.5 |
| 6,267,912 B1 * | 7/2001 | Hershkowitz et al. | 252/373 |
| 6,379,035 B1 * | 4/2002 | Kubo et al. | 366/340 |
| 6,568,845 B1 * | 5/2003 | Harada | 366/340 |
| 6,722,780 B2 * | 4/2004 | Stein et al. | 366/176.1 |
| 8,042,989 B2 * | 10/2011 | Gordon et al. | 366/176.1 |
| 8,439,282 B2 * | 5/2013 | Allen et al. | 239/570 |
| 2003/0165081 A1 * | 9/2003 | Mizutani et al. | 366/340 |
| 2004/0135017 A1 * | 7/2004 | Sekine | 241/15 |
| 2007/0160890 A1 * | 7/2007 | Fischer | 429/34 |
| 2010/0101978 A1 * | 4/2010 | Gordon et al. | 208/49 |
| 2010/0236134 A1 * | 9/2010 | Mogami et al. | 44/301 |
| 2010/0252481 A1 * | 10/2010 | Mogami et al. | 208/15 |
| 2010/0276820 A1 * | 11/2010 | Mogami et al. | 261/74 |
| 2010/0290307 A1 * | 11/2010 | Gordon et al. | 366/104 |
| 2011/0003370 A1 * | 1/2011 | Gordon et al. | 435/271 |
| 2011/0085945 A1 * | 4/2011 | Mochizuki | 422/225 |

FOREIGN PATENT DOCUMENTS

| | | | | |
|---|---|---|---|---|
| JP | 57-89935 | * | 6/1982 | |
| JP | 58-133822 | * | 8/1983 | |
| JP | 58-133823 | * | 8/1983 | |
| JP | 58133824 A | * | 8/1983 | B01F 5/00 |
| JP | 59-22634 | * | 2/1984 | |
| JP | 4-158003 | * | 4/1992 | |
| JP | 7-256071 | | 10/1995 | |
| JP | 8-173782 | | 7/1996 | |
| JP | 09052034 A | * | 2/1997 | B01F 5/00 |
| JP | 09173803 A | * | 7/1997 | B01F 1/00 |
| JP | 09173807 A | * | 7/1997 | B01F 5/00 |
| JP | 09192465 A | * | 7/1997 | B01F 5/06 |
| JP | 10024227 A | * | 1/1998 | B01F 5/06 |
| JP | 10-216492 | * | 8/1998 | |
| JP | 10216493 A | * | 8/1998 | B01F 5/06 |
| JP | 10216494 A | * | 8/1998 | B01F 5/06 |
| JP | 10216495 A | * | 8/1998 | B01F 5/06 |
| JP | 10235175 A | * | 9/1998 | B01F 3/04 |
| JP | 10328543 A | * | 12/1998 | B01F 5/06 |
| JP | 11009980 A | * | 1/1999 | B01F 5/06 |
| JP | 2000254469 A | * | 9/2000 | B01F 5/06 |
| JP | 2002028463 A | * | 1/2002 | B01F 5/00 |
| JP | 2004-024992 | | 1/2004 | |
| JP | 2010-247119 | * | 11/2010 | |
| JP | 2013-91011 | * | 5/2013 | |
| SU | 1494956 A1 | * | 7/1989 | |
| WO | WO-00/24502 | | 5/2000 | |
| WO | WO-02/070117 | | 3/2002 | |

* cited by examiner

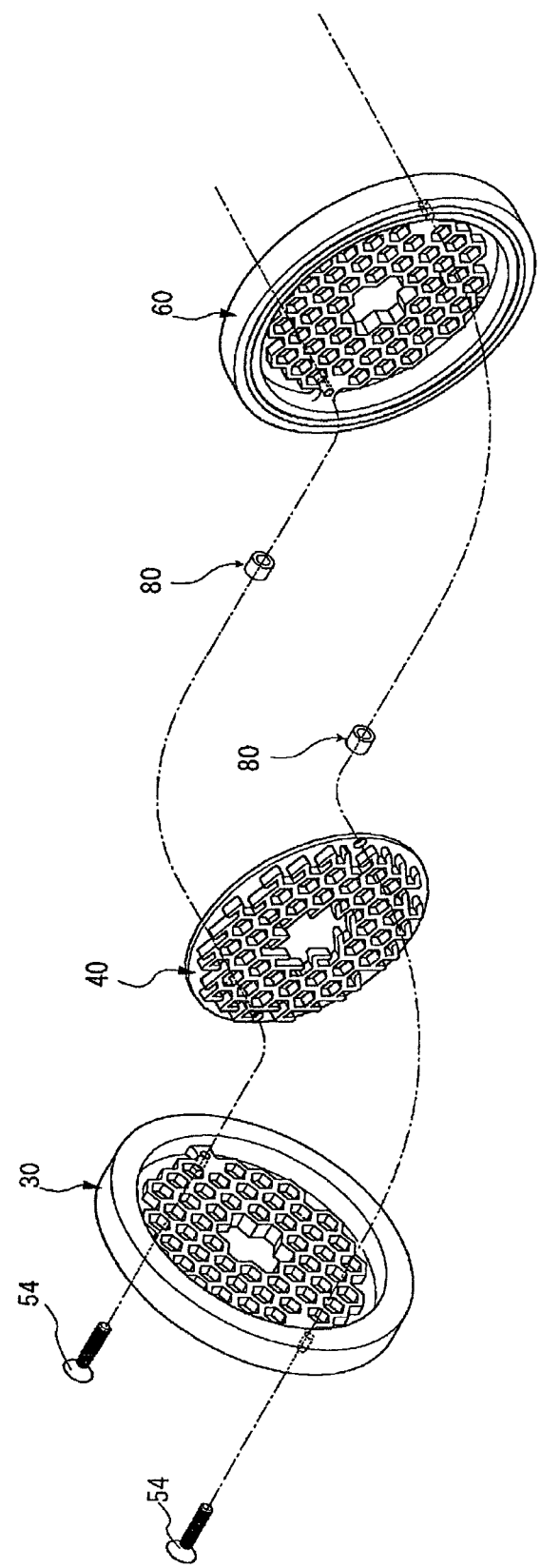

MEASUREMENT RESULT OF
AIR BUBBLE PARTICLE SIZE

AVERAGE VALUE: 0.77
STANDARD DEVIATION: 0.144

AVERAGE VALUE: 54.720
STANDARD DEVIATION: 0.164

STATIC FLUID MIXER CAPABLE OF ULTRAFINELY MIXING FLUIDS

TECHNICAL FIELD

The present invention relates to a static fluid mixer which is capable of ultrafinely and uniformly mixing fluids, for example, a liquid and a liquid; a liquid and a gas such as oxygen or a liquid targeted to be reformed such as water; a liquid and an aqueous fluid such as a royal jelly; and a solid such as a see weed and a liquid.

BACKGROUND ART

Conventionally, one aspect of a static fluid mixer includes the one in which: a disk-shaped second mixing element is disposed to be opposed to a disk-shaped first mixing element forming a flow inlet of fluid at a center part thereof; and between the mixing elements, a mixing flow path is formed through which the fluid having flown from the flow inlet to between both the mixing elements flows. In addition, the mixing flow path is provided with: a plurality of diverting parts adapted to flow and divert the fluid having flown from the flow inlet in a radiation direction; and a plurality of converging parts adapted to flow in a radiation direction and merge the fluid having been diverted at the diverting parts. Further, a flow outlet formed at the second mixing element is allowed to communicate with a trailer part of the mixing flow path, and the flow outlet is formed by punching a plenty of small-diameter circular holes at intervals in a circumferential direction.

An annular seal part is interposed between junction parts joining in a facial contact state at the circumferential edge parts of the first and second mixing elements.
Patent Document 1: Publication WO2002/070117

DISCLOSURE OF THE INVENTION

Problem(s) to be Solved by the Invention

Incidentally, in the conventional static fluid mixer, the fluid having passed through the mixing flow path flows into a plenty of small-diameter circular holes which are flow outlets formed at the second mixing element in a diverting manner; a pressure of the fluid passing through each of the small-diameter circular holes becomes non-uniform; therefore, the flow line greatly disturbs and a pressure loss increases, making it difficult to increase a treatment quantity per unit time. In addition, for example, although it is thought that the treatment quantity is increased by supplying fluid with higher pressure, since the fluid to be flown in a radiation direction acts in an invasive direction between the junction parts of the first and second mixing elements, if the fluid to be supplied is high in pressure, the acting flow pressure increases; and therefore, fluid leakage could occur to the seal part interposed between the junction parts.

The present invention has been made in view of such problem, and aims to provide a static fluid mixer which is small in pressure loss and free of fluid leakage.

Means for Solving the Problem(s)

In order to solve the above-described problem, the present invention provides a static fluid mixer as described below.

A first aspect of the invention is directed to a static fluid mixer constituting a mixing unit forming a mixing flow path which comprises:

a plurality of diverting parts adapted to dispose a plate-shaped second mixing element to be opposed to a plate-shaped first mixing element forming a flow inlet of a fluid at a center part thereof and to allow the fluid having flown from the flow inlet to be flown and diverted in a radiation direction; and a plurality of confluence parts adapted to flow and converge in a radiation direction the fluid having been diverted at the diverting parts, a flow outlet being provided at the mixing unit, for flowing the fluid having passed through the mixing flow path, wherein: the mixing unit is disposed in plurality at intervals in an axial direction in a cylindrical casing main body, allowing a flow path forming space to be formed by mixing units adjacent to each other and the casing main body;

an annular outflow path communicating with a trailer part of the mixing flow path is formed in each of the mixing units, the annular outflow path being opened in a ring shape at substantially predetermined intervals all over an entire circumference, a trailer opening of the annular outflow path being formed as a flow outlet connected to the flow path forming space; and a collecting flow path is formed in the flow path forming space, so that the fluid having passed through the mixing flow path flows out substantially equally from the entire circumference of the flow outlet opening in the ring shape, and then, flows and gathers to an axial core side of the casing main body.

A second aspect of the invention is directed to a static fluid mixer constituting a mixing unit forming a mixing flow path which comprises:

a plurality of diverting parts adapted to dispose a plate-shaped second mixing element to be opposed to a plate-shaped first mixing element forming a flow inlet of a fluid at a center part thereof and to allow the fluid having flown from the flow inlet to be flown and diverted in a radiation direction; and a plurality of confluence parts adapted to flow and converge in a radiation direction the fluid having been diverted at the diverting parts, a flow outlet being provided at the mixing unit, for flowing the fluid having passed through the mixing flow path, wherein: the first mixing element integrally forms a circumferential wall part in a protrusive shape all over an entire circumference, at a circumferential edge part of one side face of an element main body formed in a plate shape, forming a recessed part by the circumferential wall part and the element main body;

the second mixing element is disposed to be face-to-face opposed to the element main body in the recessed part, allowing an annular outflow path opening in a ring shape to be formed at substantially predetermined intervals all over an entire circumference, between an inner circumference face of a circumferential wall part of the first mixing element and an outer circumference end face of the second mixing element, a trailer opening of the annular outflow path being formed as a flow outlet, constituting a mixing unit;

the mixing unit is disposed in plurality at intervals in an axial direction in a cylindrical casing main body, allowing an inner circumferential face of the casing main body to be brought into contact with facial intimate contact with an outer circumferential face of the circumferential wall part of the first mixing element, allowing a flow path forming space communicating with the annular outflow path to be formed by mixing units adjacent to each other and the casing main body; and a collecting flow path is formed in the flow path forming space so that the fluid having passed through the mixing flow path flows out equally from the entire circumference of the flow outlet opening in the ring shape, and then, flows and gathers to an axial core side of the casing main body.

A third aspect of the invention is directed to the static fluid mixer, wherein: in the flow path forming space, a plurality of guide members stabilizing a flow path sectional area are arranged in vicinity of a flow outlet opening in a ring shape and at an axial core side of a casing main body, allowing the guide members to be disposed at intervals in a circumferential direction along a flow outlet, thereby forming a collecting flow path between the guide members adjacent thereto, whereas forming an annular communication path extending in a circumferential direction along an inner circumferential face side of the casing main body; and a leader part of the collecting flow path is connected to an inner circumferential face part of the annular communication path, allowing the collecting flow path to communicate with the flow outlet via the annular communication path.

A fourth aspect of the invention is directed to the static fluid mixer, wherein a mixing unit disposes and constitutes a collecting-flow-path forming element at a rear side of a second mixing element, and the collecting-flow-path forming element forms an extensive guide member stabilizing a flow path sectional area on one side face of an element main body.

A fifth aspect of the invention is directed to the static fluid mixer, wherein: a plurality of mixing units are disposed at intervals in an axial direction in a casing main body formed in a cylindrical shape, allowing first and second mixing elements and a collecting flow path forming element, constituting the mixing units, to be formed in a disk shape;

a guide member provided in the collecting-flow-path forming element is formed, in a substantially arc-shaped flat shape, of an outer circumferential arc face formed on an arc face having a same curvature as that of an outer circumferential edge of an element main body, a pair of side faces connected to be extended from both ends of the outer circumferential arc face to a center side of the element main body, and an abutment face formed as a flat face parallel to the element main body; and the guide body is disposed in plurality at equal intervals in a circumferential direction at a circumferential part of the element main body, and is formed so that: an outer circumferential arc face of each of the guide members is flush with an outer circumferential end face of the collecting-flow-path forming element and an outer circumferential end face of the second mixing element; and side faces opposite to each other, of the adjacent guide members, are parallel to each other in a circumferential direction, allowing a groove part width of a groove part, which is formed of a side face of an adjacent guide member and a rear face of the element main body, to be substantially equal from a circumferential side to a center side of the collecting-flow-path forming element.

A sixth aspect of the invention is directed to a static air bubble generator, wherein a gas-liquid mixture fluid supply pipe for supplying a gas-liquid mixture fluid with a gas and a liquid being mixed with each other is connected to the flow inlet of the static fluid mixer.

A seventh aspect of the invention is directed to the static air bubble generator, wherein the gas to be mixed is oxygen.

An eighth aspect of the invention is directed to a static liquid reforming treatment device, wherein a liquid supply pipe for supplying a liquid targeted to be reformed is connected to the flow inlet of the static fluid mixer.

A ninth aspect of the invention is directed to the static liquid reforming treatment device, wherein the liquid targeted to be reformed is water.

A tenth aspect of the invention is directed to a static aqueous fluid mixer, wherein an aqueous fluid supply pipe for supplying an aqueous fluid including at least one component of protein, carbohydrate, glycoprotein, and lipid, and water content is connected to the flow inlet of the static fluid mixer.

An eleventh aspect of the invention is directed to the static aqueous fluid mixer, wherein the aqueous fluid includes a royal jelly.

A twelfth aspect of the invention is directed to a static solid-liquid mixer, wherein a solid-liquid mixture fluid supply pipe for supplying a solid-liquid mixture fluid with a solid and a liquid being mixed with each other is connected to the flow inlet of the static fluid mixer.

A thirteenth aspect of the invention is directed to the static solid-liquid mixer, wherein the solid-liquid mixture fluid includes a see weed containing fucoidan.

Advantageous Effect(s) of the Invention

In a static flow mixer according to the present invention, a fluid component can be miniaturized more finely and uniformized (ultra-miniaturized and uniformized). Moreover, in the present invention, when a fluid having passed through a mixing flow path is allowed to flow out from a flow outlet to a collecting flow path, a trailer opening of an annular outflow path opening in a ring at substantially equal intervals all over an entire circumference is formed as a flow outlet; the flow outlet thus exists at substantially equal width all over the entire circumference; and the flow line of the fluid flowing out substantially equally from the entire circumference of the flow outlet is not extremely disturbed. Therefore, variation in fluid pressure is not prone to occur. As a result, the fluid pressure is uniformized, and a flow path resistance lowers. If the flow path resistance lowers, a pressure loss is reduced, and even if a pressure of the fluid to be supplied is not set at a high pressure, a treatment quantity can be increased.

In addition, a flow path forming space communicating with an annular outflow path is formed of mixing units adjacent to each other and a casing main body; in the flow path forming space, the fluid having passed through a mixing flow path is flown out from an entire circumference of a flow outlet opening in a ring shape at a substantially equal width into a diameter-extended flow path forming space. In this manner, the fluid is flown out from the flow path of the substantially equal width to the diameter-extended flow path; and therefore, a significant effect of pressure loss reduction is attained.

If the pressure loss is reduced, liquid mixing treatment can be performed at a low pressure, and a need to prevent fluid leakage at a seal part is eliminated, namely, a need to use a seal member such as packing is eliminated or significantly reduced. As a result, activity of replacement of a seal member is eliminated or significantly reduced; and therefore, speedy and easy maintenance activity of the static fluid mixer per se, according to the present invention, can be achieved, and work efficiency can be enhanced.

In addition, in the static fluid mixer according to the present invention, a pressure loss is reduced as described above; and therefore, when treated fluid of a same quantity is supplied, an output of treated fluid supply means such as a pump can be reduced. Further, if a same output is maintained, treatment capacity increases.

Although this is thought to be due to reduction of a pressure loss, the noise exerted by fluid mixing treatment is reduced, quietness is enhanced, and vibration is reduced. Further, if noise or vibration at the time of fluid mixing treatment is reduced, it becomes possible to set up the static fluid mixer in a location requiring quietness, such as a hospital, for example.

BRIEF DESCRIPTION OF THE DRAWINGS

FIG. 21 is an exploded perspective view showing an assembling state of the mixing unit of the fourth embodiment;

EXPLANATION OF REFERENCE NUMERALS AND LETTERS

Figure 1:
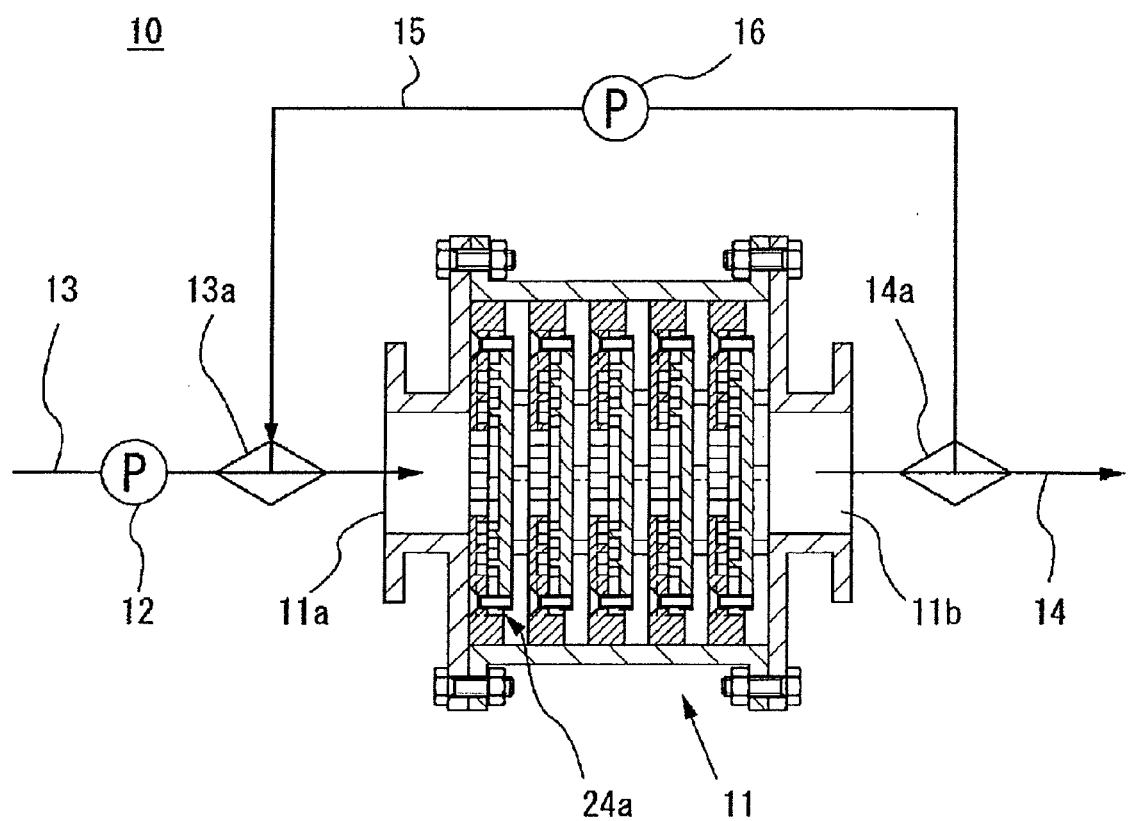
FIG. 1 is a schematic view showing a configuration of a static air bubbles generator of a first embodiment.

10 Static fluid mixer
24 Mixing unit
24a Annular outflow path
25 Mixing flow path
26 Collecting flow path
27 Annular communication path
30 First mixing element
32 Flow inlet
40 Second mixing element
35a, 41a Rectangular parts (diverting part and converging part)
52 Guide member
60 Lead-out side element
62 Fluid discharge port
80 Spacer
82 Complex flow generating member

BEST MODE FOR CARRYING OUT THE INVENTION

Hereinafter, embodiments of a static fluid mixer according to the present invention will be described in detail.

The static fluid mixer according to the present invention constitutes a mixing unit forming a mixing flow path which comprises: a plurality of diverting parts adapted to dispose a disk-shaped second mixing element to be opposed to a disk-shaped first mixing element forming a flow inlet of fluid at a center part thereof and to flow and diverting the fluid having flown from the flow inlet in a radiation direction in between both mixing elements; a plurality of converging parts adapted to flow and converge in a radiation direction the fluid having diverted at the diverting parts; and at the mixing unit, a flow outlet adapted to flow out the fluid having passed through the mixing path is provided.

In such static fluid mixer, a plurality of mixing units are disposed at intervals in their axial direction in a cylindrical casing main body; a flow path forming space is formed by the adjacent mixing units and the casing main body; at each of the mixing units, an annular outflow path communicating with a trailer part of the mixing flow path is formed; the annular outflow path is opened in a ring shape at substantial predetermined intervals over the entire circumference; a trailer opening of the annular outflow path is formed as a flow outlet connected to the flow path forming space; and in the flow path forming space, the fluid having passed through the mixing flow path flows out substantially equally from the entire circumference of the flow outlet opening in a ring shape so that a collecting flow path is formed allowing fluid to be flown and collected at the axial core side of the casing main body.

Specifically, the first mixing element constitutes a mixing unit in such a manner that: a circumferential wall part is formed integrally and in protruding manner all over the entire circumference at a circumferential edge part of one side face of an element main body formed in a planar shape to allow a recessed part to be formed by the circumferential wall part and the element main body; in the recessed part, the second mixing element is disposed to be face-to-face opposed to the element main body to form an annular outflow path opening in a ring shape at substantially equal intervals all over the entire circumference between an internal circumferential face of a circumferential wall part of the first mixing element and an outer circumferential end face of the second mixing element; and a trailer opening of the annular outflow path is formed as a flow outlet.

In addition, the mixing unit is disposed in plurality at intervals in its axial direction in a cylindrical casing main body; an inner circumferential face of the casing main body and an outer circumferential face of the circumferential wall part of the first mixing element are brought into facial intimate contact with each other; and a flow path forming space communicating with the annular outflow path is formed by the adjacent mixing units and the casing main body.

With such constitution, a collecting flow path can be allowed to communicate with a mixing flow path via an annular outflow path. At this time, the annular outflow path is formed to be opened in a ring shape at substantial equal intervals over the entire circumference; a trailer opening of the annular outflow path is formed as a flow outlet; fluid can be smoothly flown out from the entire circumference of the flow outlet; and flow outlets exist all over the entire circumference, and therefore, the variation in fluid pressure is unlikely to occur; and as a result, a flow path resistance lowers. If the flow path resistance lowers, a pressure loss is reduced, and even if a pressure of fluid to be supplied is not set at a high pressure, a treatment quantity can be increased.

In addition, since the flow path forming space communicating with the annular flow path is formed by the adjacent mixing units and the casing main body, the fluid having passed through the mixing flow path is flown out from the entire circumference of the flow outlet opening in a ring shape at substantially equal widths into a diameter-extended flow path forming space. Thus, since the fluid is adapted to flow out from a flow path with its substantially equal width into the diameter-extended flow path, a significant effect of pressure loss reduction is attained. After a pressure loss has been reduced, fluid mixing treatment can be performed at a low pressure, and a seal part adapted to prevent fluid leakage does not need to be interposed between a first mixing element and a second mixing element. Further, the flow outlet opening in a ring shape is allowed to communicate with a collecting flow path all over the entire circumference; through the collecting flow path, the fluid can be collected to be flown to the axial core side of the casing main body; and therefore, a pressure loss can be significantly lowered. Accordingly, in this respect as well, a treatment quantity per unit time can be increased, and fluid leakage can also be reliably avoided. The fluid having been collected to the axial core side of the casing main body is then flown into a flow inlet of the subsequent mixing unit or discharged from a fluid lead-out port or a fluid discharge port.

At this time, an end face of the circumferential wall part of the first mixing element can be appropriately set so as to be positioned in flush with a rear face of the second mixing element or to be positioned at the collecting flow path side. By doing this, the fluid having passed through the mixing flow path and flown out from the entire circumference of the flow outlet can be smoothly collected to be flown to the axial core side of the casing main body through the collecting flow path. Thus, if the fluid to be flown out substantially equally from the entire circumference of the flow outlet can be smoothly flown in a straight-backward or close-to-center direction in the collecting flow path, a pressure loss lowers more remarkably.

In addition, the mixing unit made of the first mixing element and the second mixing element unit is disposed in plurality at intervals (from the upstream side to the downstream side) in the axial direction in the cylindrical casing main body; and the flow path forming space is formed by the adjacent mixing units and the casing main body. At this time, the outer circumferential face is brought into intimate contact with the inner circumferential face of the casing main body, disallowing fluid leakage from between both of the circumferential faces.

The number of mixing units disposed is thus set as required, whereby mixing treatment of fluids is made for each of the mixing units, and mixing treatment performance (for example, performance of miniaturizing a target to be mixed more finely or performance of achieving miniaturization in more uniform size) can be appropriately improved. As long as a target for treatment is a gas in gas-liquid mixture fluid, finer and more uniformly sized air bubbles can be generated.

At this time, between the second mixing element of the upstream-side mixing unit and the first mixing element of the downstream-side mixing unit, a collecting flow path acquiring structure (flow path forming space acquiring structure) may be provided for acquiring a collecting flow path (flow path forming space) adapted to guide the liquid having flown out from the upstream side flow outlet to the flow inlet of the downstream side mixing unit.

The collecting flow path acquiring structure can include a protrusion which is provided on a rear face of the second mixing element, for example.

If the width in the upstream-downstream direction of such protrusion is provided to be formed at a desired width, when a plurality of mixing units are disposed to be arranged from the upstream side to the downstream side, the protrusion of the second mixing element of the upstream side mixing unit abuts against the first mixing element of the downstream side mixing unit, whereby the preferable collecting flow path (flow path forming space) described previously is allocated.

In the flow path forming space, a plurality of guide members stabilizing a flow path sectional area can be arranged in the vicinity of the flow outlet opening in a ring shape and at the axial core side of the casing main body. These guide members are disposed at intervals in the circumferential direction along the flow outlet, whereby a collecting flow path is formed between the adjacent guide members, whereas at the inner circumferential face side of the casing main body, an annular communication path extending in a circumferential direction along the casing body is formed. At this time, a leader part of the collecting flow path is connected to the inner circumferential face side of the annular communication path, and the collecting flow path is allowed to communicate with the flow outlet via the annular communication path.

Here, if the fluid having flown out from the flow outlet opening in a ring shape is collected at one flow inlet or flow lead-out port, and then, is flowed into the flow inlet or one flow out from the fluid lead-out port, the collecting flow path becomes a structure in which a flow path sectional area is rapidly reduced from the flow outlet which is on the circumferential side to the flow inlet or fluid lead-out port which is at the center side. In a structure in which a flow path sectional area rapidly increases or decreases, a flow path resistance is prone to increase, and a fluid pressure is probe to be locally at a high pressure. In this respect, if guide members stabilizing a flow path sectional area are provided in the collecting flow path, the flow path sectional area is stabilized from the flow outlet to the flow inlet or fluid lead-out port, an increase in flow path resistance or a locally high fluid pressure is prevented. The guide members are advantageous in that they can also be employed as protrusions for acquiring a collecting flow path (flow path forming space).

As a mixing unit, a collecting-flow-path forming element is disposed and constituted at the rear side of the second mixing element, and the collecting-flow-path forming element allows an extensive guide member, stabilizing a flow path sectional area, to be formed at one side face of an element main body.

A guide member can also be integrally formed with the second mixing element. In this case, a static fluid mixer can be compactly employed without a need to increase an additional number of members.

In addition, a lead-out side element is provided having been disposed at the rear side of the second mixing, stabilizing the shape of the collecting flow path formed relative to the second mixing element; and a structure may be provided in such a manner that at the lead-out side element, a flow discharge port adapted to discharge the fluid having passed through the collecting flow path is formed.

With such structure, a collecting flow path can be formed at a position between the second mixing element and the lead-out side element. In a structure free of the lead-out side element, a collecting flow path is formed between: a member when the second mixing element and/or guide members at the mixing unit side has and/or have been provided; and another structural member disposed adjacent thereto. For example, in respect of a case in which a plurality of mixing units are employed, as one example, there can be enumerated the one in which they are formed between the upstream side second mixing element and the downstream side first mixing element.

As just described, in a constitution of forming a collecting flow path between other structural members, a sectional area of the collecting flow path or the like is prone to be dispersed. If there is dispersion, an increase in flow path resistance or the generation of a locally high fluid pressure is prone to occur. In this respect, if a collecting flow path can be formed at a position between the second mixing element and the lead-out side element, the shape of the collecting flow path is stabilized, and an increase in flow path resistance or the generation of a locally high fluid pressure is prevented.

In addition, a structure may be provided to have a lead-out element disposed at the rear side of the second mixing element while being in contact with the guide members. With such structure, the shape of the collecting flow path, formed at a position between the second mixing element and the lead-out side element, is stabilized; by means of the guide members provided in the collecting flow path, a flow path sectional area is stabilized from the flow outlet to the axial core side of the casing main body; and an increase in flow path resistance or the generation of a locally high fluid pressure is prevented.

In addition, the lead-out side element may be provided to have a plurality of recessed parts and/or protrusive parts on a surface facing the collecting flow path. By employing the lead-out side element having the plurality of recessed parts and/or protrusive parts on the surface facing the collecting flow path, among the flow paths from the flow outlet to the fluid discharge port, when fluid passes through the flow path which the surface of the lead-out side element faces, a local high-pressure portion or a local low-pressure portion emerges in the fluid by the presence of the recessed parts and/or the protrusive parts.

In such fluid, when a low-pressure portion (a negative-pressure portion such as a vacuum portion, for example) locally emerges, a so called bubbling phenomenon occurs, and then, there occurs a phenomenon called so called cavitation, that: gas is generated in liquid; small air bubbles expand (breaks); and the resultant gas (air bubbles) collapse(s) (disappear(s)). By means of a force generated when such cavitation occurs, miniaturization of a target for mixing is performed, and fluid mixing is accelerated.

As described previously, if a fluid high-pressure portion locally emerges at a position at which fluid leakage is prone to occur or in the vicinity thereof, fluid leakage is prone to occur; and therefore, in this respect, it is not preferable that a local high-pressure portion emerges. However, as described above, by employing the lead-out side element having irregularities on the surface facing the collecting flow path, among the flow paths from the flow outlet to the flow discharge port, a local high-pressure portion or a local low-pressure portion can be allowed to emerge in fluid only at a flow path of a portion which the surface of the lead-out side element faces.

At another portion, for example, in a region in which fluid leakage is prone to occur, such as the vicinity of the flow outlet, a state in which the emergence of a local high-pressure portion is prevented is maintained by stabilization of a flow path sectional area. Therefore, a situation in which fluid leakage is prone to occur is prevented.

In addition, as described previously, without a need to provide guide members in a collecting flow path, a structure can be provided to have a lead-out side element disposed at the rear side of the second mixing element while being in contact with the collecting flow path. Thus, with the structure free of guide members, a static fluid mixer can be simply structured and can be provided at a low cost.

Further, a complex flow generating means for forming the mixture fluid having flown out from the flow outlet as a complex flow may be provided in the collecting flow path. The term "complex flow" used here means a flow of fluid flowing while scrubbing a face of an object, and the complex flow generating means is a protrusion having a face generating a complex flow.

Therefore, the complex flow generating means is disposed in the collecting flow path, whereby, when fluid passes through the inside of the collecting flow path, a local high-pressure portion or a local low-pressure portion emerges in fluid by the presence of the complex flow generating means.

Moreover, in such fluid, when a low-pressure portion (for example, a negative-pressure portion such as a vacuum portion) locally emerges, a so called bubbling phenomenon occurs, and then, there occurs a phenomenon called so called cavitation, that: gas is generated in liquid; small air bubbles expand (breaks); and the resultant gas (air bubbles) collapse(s) (disappear(s)). By means of a force generated when such cavitation occurs, miniaturization of a target for mixing is performed, and fluid mixing is accelerated.

As described previously, if a fluid high-pressure portion locally emerges at a position at which fluid leakage is prone to occur or in the vicinity thereof, fluid leakage is prone to occur; and therefore, in this respect, it is not preferable that a local high-pressure portion emerges. However, as described above, by disposing a complex flow generating means in a collecting flow path, among the flow paths from the flow outlet to the fluid discharge port, a local high-pressure portion or a local low-pressure portion can be allowed to emerge in fluid only at a site at which the complex flow generating means is disposed, and fluid mixing is accelerated.

In addition, a face of the complex flow generating means for generating a complex flow is formed as a protrusive face and/or a recessed face, whereby variations are allowed to occur in the flow path cross section of the collecting flow path, and pulsating flow can be generated. In the case where such pulsation flow has been generated as well, a local high-pressure portion or a local low-pressure portion can be allowed to emerge in fluid only at a site at which the complex flow generating means is disposed, and fluid mixing is accelerated.

Incidentally, in the static fluid mixer, if a treatment quantity per unit time is increased, the fluid targeted for treatment, supplied to the static fluid mixer according to the present invention, is treated, whereby a high temperature may occasionally result.

Therefore, there has been an inconvenience in a case where an attempt is made to make the temperature of the fluid targeted for treatment uniform before or after treatment or in a case where an attempt is made to obtain fluid targeted for treatment, having a predetermined temperature, after treatment. In this respect, by providing a temperature control means for performing temperature control of the fluid targeted for treatment, to be led out from the lead-out port after treatment, the fluid targeted for treatment can be cooled or the fluid targeted for treatment, having a desired temperature, can be obtained.

The temperature control means can include a structure of disposing a cooling jacket which is capable of distributing fluid for temperature control such as cooling water, at an outer circumference of a mixing unit, for example.

With such structure, the fluid for temperature control is distributed into a jacket during treatment of the fluid targeted for treatment, whereby the fluid targeted for treatment can be cooled or can be controlled at a predetermined temperature.

In addition, a gas-liquid mixture fluid supply pipe, for supplying gas-liquid mixture fluid with a gas and a liquid being mixed with each other, is connected to the flow inlet of the static fluid mixer, whereby the static fluid mixer can be employed as a static air bubble generator.

Air or oxygen as a mixture gas may be mixed with a predetermined liquid, for example. By treating a gas-liquid mixture fluid between electrolytic water, ionized alkaline water, or acidic water, and gas such as air, it is possible to produce electrolytic water, ionized alkaline water, or acidic water, containing fine air bubbles. These waters each have a high function as wash water, for example, and are preferable as wash water.

In addition, with the static air bubble generator according to the present invention, very fine (on the nano-level of less than 1 micron) and uniform air bubbles, called nano-bubbles, can be generated by treating gas-liquid mixture fluid. Water containing such fine air bubbles functions as wash water. Therefore, the static air bubble generator according to the present invention is also preferable as a device for producing such wash water.

Further, the air bubbles-containing water, which is treated by means of the static air bubble generator according to the present invention, is preferable as sludge-water purifying water, and is also preferable as water for recovering fatigue by being in touch with an exhausted living body or being supplied as supply water. Although a variety of methods of getting the water in touch with a surface of a living body are considered, for example, a method of employing the water as hot water in bath at the time of taking a bath can be included.

Furthermore, the air bubbles-containing water, treated by means of the static air bubble generator according to the present invention, is also preferable as purifying water employed for purifying the water reserved in place such as a bath, a water tank, or a pool for a predetermined period of time.

Still furthermore, the water treated by means of the static air bubble generator according to the present invention is also preferable as water for washing and/or sterilizing foods such as plants. More specifically, the above treated water is preferable for washing and/or sterilizing vegetables, fruits, farm products, or foods, for example.

Yet furthermore, with the static air bubble generator according to the present invention, air bubbles having average particle size of 500 nm or less can be generated in fluid targeted for treatment, and air bubbles having average particle size of 50 nm or less can also be generated in fluid targeted for treatment. In addition, an ozone-containing water solution can be produced by employing an ozone-containing gas as the gas of a gas-liquid mixture fluid to be supplied to the static air bubble generator. Further, salt may be contained in the fluid.

Moreover, a liquid supply pipe for supplying liquid targeted to be reformed is connected to the flow inlet of the static fluid mixer, whereby the static fluid mixer can be employed as a static device for liquid reforming treatment. The liquids targeted to be reformed can include a variety of liquids such as water, for example.

With the static liquid reforming treatment device according to the present invention, mixing treatment is applied to the liquid targeted to be reformed, thereby making it possible to reform the liquid. For example, water generally does not exist in a single molecule, but forms a cluster made of a plenty of molecules; and if water is treated by means of the static liquid reforming treatment device, reformed water with its smaller cluster size can be obtained.

The reformed water with its smaller cluster size is improved in solubility at the time of dissolving a water-soluble substance, for example, and is improved in permeability in that it is more easily absorbed in digestive canal or it is easily taken in intra-body cells.

In addition, an aqueous fluid supply pipe, for supplying aqueous fluid including at least any one component of protein, amino acid, carbohydrate, glycoprotein, and lipid and water content, is connected to the flow inlet of the static fluid mixer, whereby the static fluid mixer can be employed as a static aqueous fluid mixer.

The static aqueous fluid mixer is capable of treating a variety of fluids including at least one component of water and protein, amino acid, carbohydrate, glycoprotein, and lipid, such as a liquid including water and a royal jelly, for example.

With the static aqueous fluid mixer according to the present invention, mixing treatment is applied to the fluids targeted for mixing, whereby the fluids can be uniformly mixed with each other, and so called emulsification can be performed. In this manner, a cream-like or emulsion-like mixture can be produced. For example, in the case where the target for mixing is a mixture of water and a royal jelly, if this mixture is treated by means of the static aqueous fluid mixer, a polymeric component such as glycoprotein included in a royal jelly is miniaturized and uniformized, and an emulsified target for mixing is obtained.

In addition, a solid-liquid mixture liquid supply pipe, for supplying a solid-liquid mixture fluid with a solid and a liquid being mixed with each other, is connected to the flow inlet of the static fluid mixer, whereby the static fluid mixer can be employed as a static solid-liquid mixture mixer.

A variety of solid-liquid mixture fluids can include: a solid-liquid mixture fluid including, as a solid matter, sea weeds such as brown alga containing fucoidan; a solid-liquid mixture fluid including, as a solid matter, sea weeds such as brown alga such as Laminaria japonica, Hijiki, or Nemacystus decipiens including alginic acid; a solid-liquid mixture fluid including, as a solid matter, mushrooms or analogous including β-glucan; a solid-liquid mixture fluid including, as a solid matter, Korean ginseng or Tienchi ginseng including ginsenoside; a solid-liquid mixture fluid including, as a solid matter, garlic including alliin or allicin; a solid-liquid mixture fluid including, as a solid matter, soy beams including isoflavone; a solid-liquid mixture fluid including, as a solid matter, ginger including gingerol; a solid-liquid mixture fluid including, as a solid matter, aloe including aloin; a solid-liquid mixture fluid including, as a solid matter, curcuma including curcumin; a solid-liquid mixture fluid including, as a solid matter, other vegetables or fruits; and a solid-liquid mixture fluid made of fine particles such as powder and water, for example.

If such solid-liquid mixture fluid is treated by means of the static solid-liquid mixer, the abovementioned component such as fucoidan can be extracted efficiently.

With the static solid-liquid mixer according to the present invention, mixing treatment is applied to the fluid targeted for mixing, whereby a solid component such as solid particles and a liquid component such as water are miniaturized, both of which can be uniformly mixed with each other and can be dispersed.

Next, more specific embodiments of the static fluid mixer according to the present invention will be described referring to the drawings.

[Static Fluid Mixer of First Embodiment]

First, a static fluid mixer of a first embodiment will be described in detail, referring to FIGS. 1 to 8.

As shown in FIG. 1, a static fluid mixer 10 of the first embodiment is provided with: a fluid mixer 11 for applying mixing treatment to fluid targeted for treatment; a fluid introducing pipe 13 connected to a fluid introducing port 11a of the fluid mixer 11; and a fluid lead-out pipe 14 connected to a fluid lead-out port 11b of the fluid mixer 11. In addition, a first pump 12 for supplying treatment fluid to the fluid mixer 11 is provided partway of the fluid introducing pipe 13. In this manner, the fluid is introduced into the fluid mixer 11 through the fluid introducing pipe 13 by means of the first pump 12 so as to be able to apply mixing treatment by means of the fluid mixer 11. In addition, the fluid to which mixture treatment has been applied can be led out from the fluid lead-out pipe 14.

In addition, one end of a fluid return pipe 15 is connected to the fluid introducing pipe 13 of the static fluid mixer 10 via a first three-way valve 13a, whereas the other end of the fluid return pipe 15 is connected to the fluid lead-out pipe 14 via a second three-way pipe 14a. Further, at an intermediate part of the fluid return pipe 15, a second pump 16 is provided for supplying the fluid re-collected by the second three-way valve 14a so as to be returned to a position of the first three-way valve 13a.

Therefore, by using the fluid return pipe 15 in which the second pump 16 has been installed, the same fluid is repeatedly supplied to the fluid mixer 11, allowing the fluid to be subjected to mixing treatment.

In this manner, a fluid component can be ultra-miniaturized more significantly (from nano-level to several nanometers level) and can be miniaturized to the uniform size.

Figure 2:
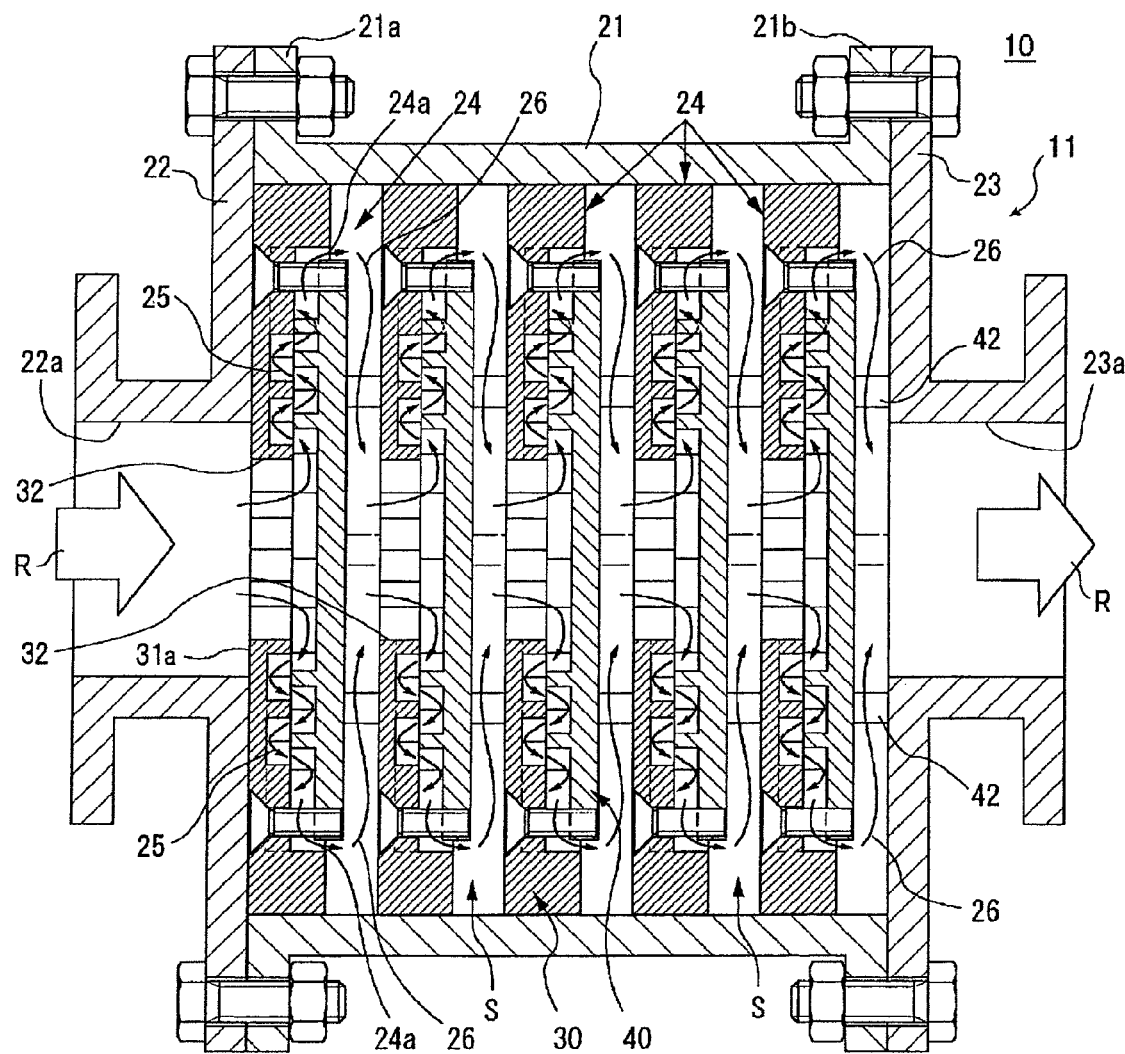
FIG. 2 is a sectional front view showing a fluid mixer of the first embodiment.

The fluid mixer 11, as shown in FIG. 2, has a cylindrical casing main body 21, both ends of which open. Flanges 21a, 21b are formed at opening portions at both ends of the casing main body 21, and capping members 22, 23 of the casing main body 21 are removably mounted on the flanges 21a, 21b, respectively. Openings 22a, 23a, which are gateways of fluid targeted for treatment of the static fluid mixer 10 (hereinafter, occasionally merely referred to as a "fluid"), are formed at the capping members 22, 23, respectively.

In the embodiment, the opening of the capping member 22, positioned at the left side in FIG. 2, is employed as a fluid feed port 22a, whereas the opening of the capping member 23, positioned at the right side in the figure, is employed as a fluid lead-out port 23a. Here, in the embodiment, as shown in FIG. 2, fluid R is adapted to flow the inside of the casing main body 21 from the side of the fluid introducing port 22a which is at the left-side upstream side to the fluid lead-out port 23a which is at the right-side downstream side.

In addition, a plurality of sets (five sets in the embodiment) of the mixing units 24 for applying mixing treatment to the fluid R are accommodated in the casing main body 21 by being disposed at intervals along the axial direction of the casing main body 21. At this time, an inner circumferential face of the casing main body 21 and an outer circumferential face of each of the mixing units 24 are brought into a gapless intimate contact with each other.

Figure 3:
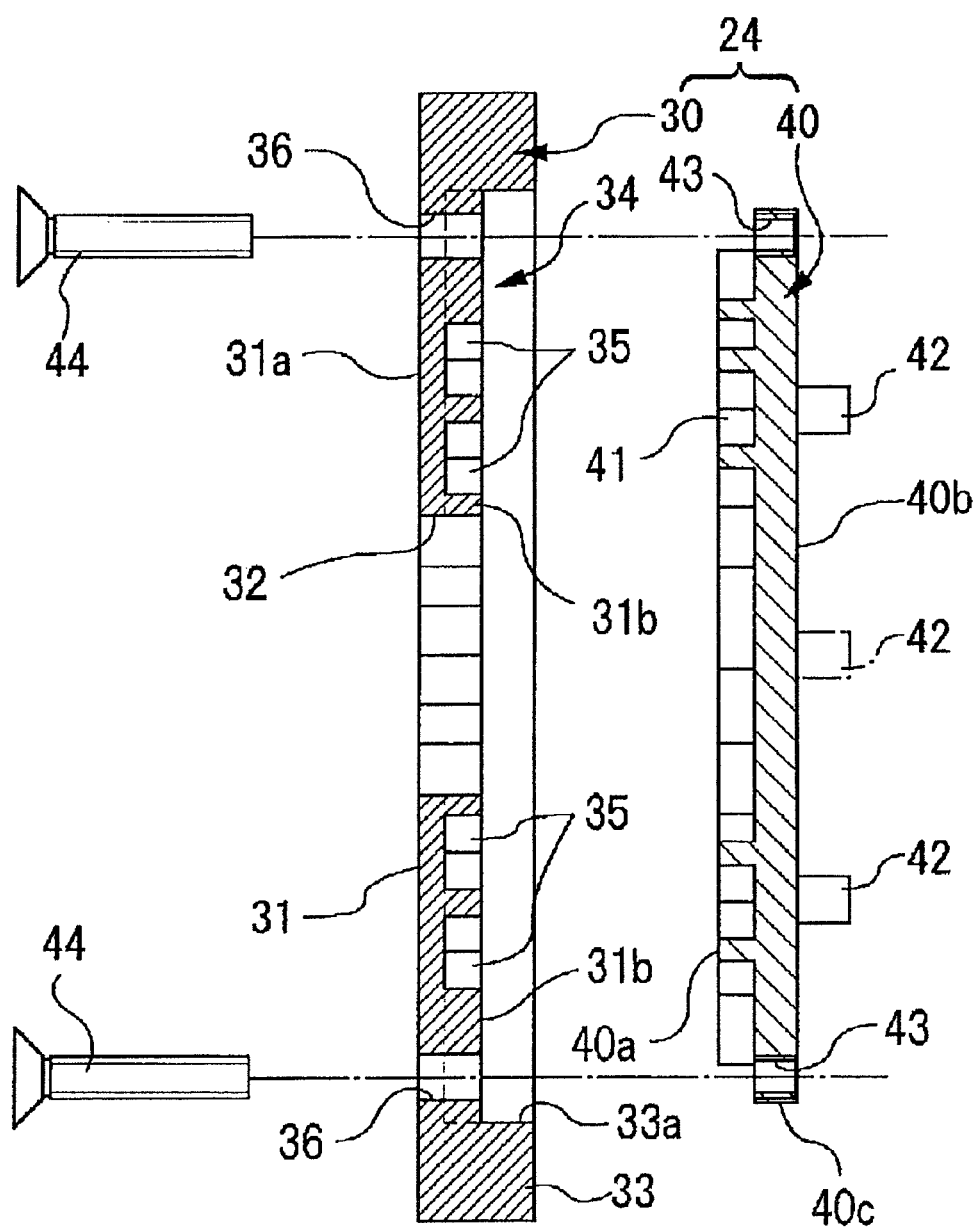
FIG. 3 is an exploded sectional front view showing a mixing unit of the fluid mixer of the first embodiment.

As shown in FIG. 3, each mixing unit 24 is structured similarly, and is provided with two disk-shaped (substantially disk-shaped) members disposed in opposite to each other, more specifically first and second mixing elements 30, 40 which are formed in the disk shape. Among the two first and second mixing elements 30, 40, the first mixing element 30 disposed at the fluid feed port side (upstream side) allows a flow inlet 32 for fluid R (indicated by the arrow in FIG. 2 or the like) to be formed in a penetrative state at the center part of the disk-shaped element main body 31.

Further, a thick circumferential wall portion 33 is formed to be protrusive at a downstream side all around the outer circumferential edge part of an element main body 31; a recessed part 34 having a circular opening is formed toward the downstream side by means of the element main body 31 and the circumferential wall portion 33; and a disk-shaped space is formed in the recessed part 34. Reference numeral 31a designates an upstream side face oriented toward the fluid feed port 22a of the element main body 31 and reference numeral 31b designates a downstream side face oriented toward the fluid lead-out port 23a of the element main body 31 (which is opposite to a second mixing element 40).

Figure 4A:
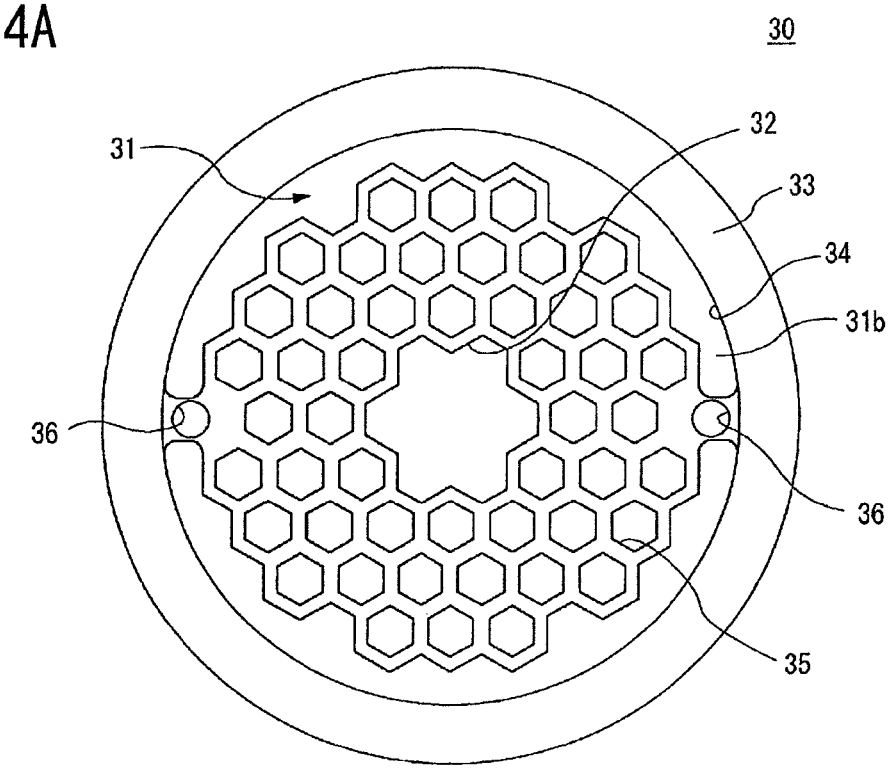
FIG. 4A is a right side view showing a first mixing element of the mixing unit of the first embodiment.
Figure 4B:
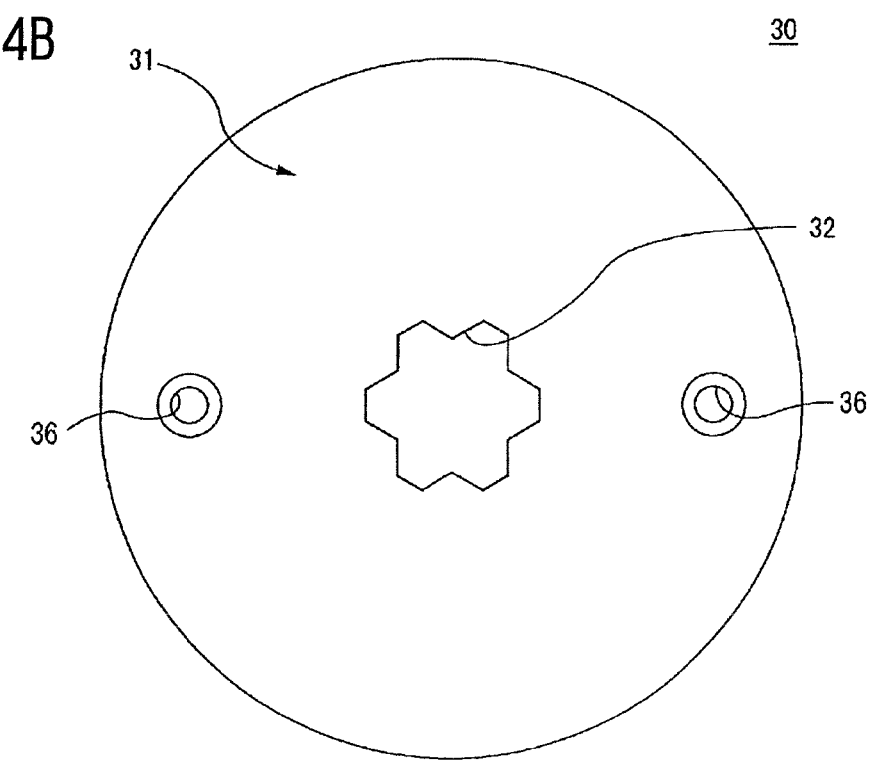
FIG. 4B is a left side view showing a first mixing element of the mixing unit of the first embodiment.

As shown in FIG. 4, at the downstream side face 31b of the element main body 31, a plurality of recessed parts 35, opening shapes of which are regular hexagons, are formed in a gapless manner. A number of recessed parts 35 are formed in a so called honeycomb shape. Reference numeral 36 designates a through hole for screw employed to fix the second mixing element 40 to the first mixing element 30 by means of screw-tightening.

Figure 5A:
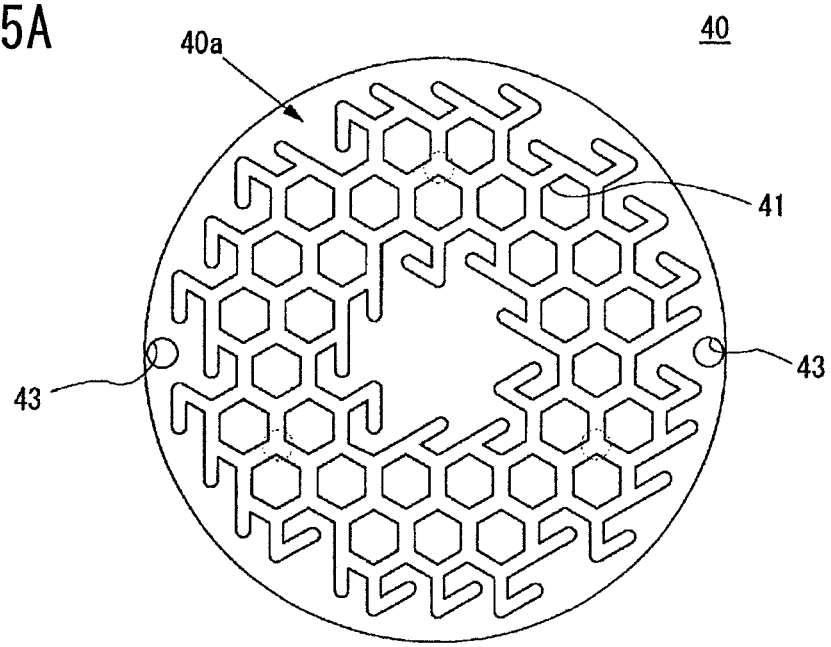
FIG. 5A is a right side view showing a second mixing element of the mixing unit of the second embodiment.
Figure 5B:
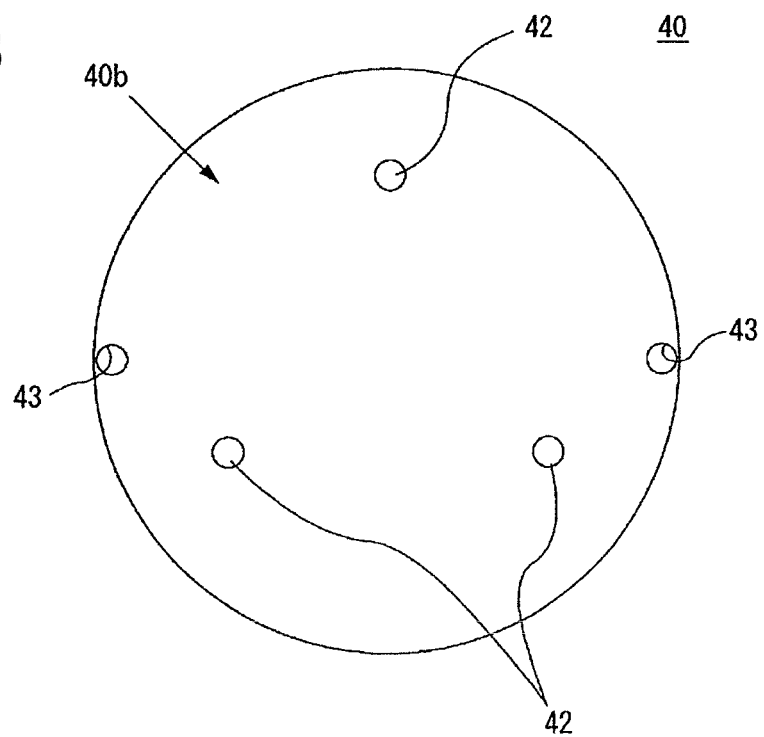
FIG. 5B is a left side view showing the second mixing element of the mixing unit of the first embodiment.

As shown in FIGS. 3 and 5, among the two mixing elements, the second mixing element 40 disposed at the fluid lead-out side (downstream side) is smaller in diameter than the first mixing element 30. The diameter of the second mixing element 40 is smaller than that of the recessed part 34 of the first mixing element 30, allowing the second mixing element 40 to be disposed after engaged into the recessed part 34 in a face-to-face opposite state.

In addition, on an opposite face to the first mixing element 30, of the second mixing element 40, i.e., at the upstream side 40a (opposite to the first mixing element) which is oriented toward the fluid feed port 22a, like the element main body 31 of the first mixing element 30, a plurality of recessed parts 41, opening shapes of which are regular hexagons, are formed in a gapless state. Further, three column-shaped protrusions 42 are formed on a surface of the downstream side face 40b that is facially opposite to the upstream side face. Reference numeral 43 designates a screw hole formed to mount a female screw employed to fix the second mixing element 40 to the first mixing element 30 by means of screw-tightening.

Figure 6:
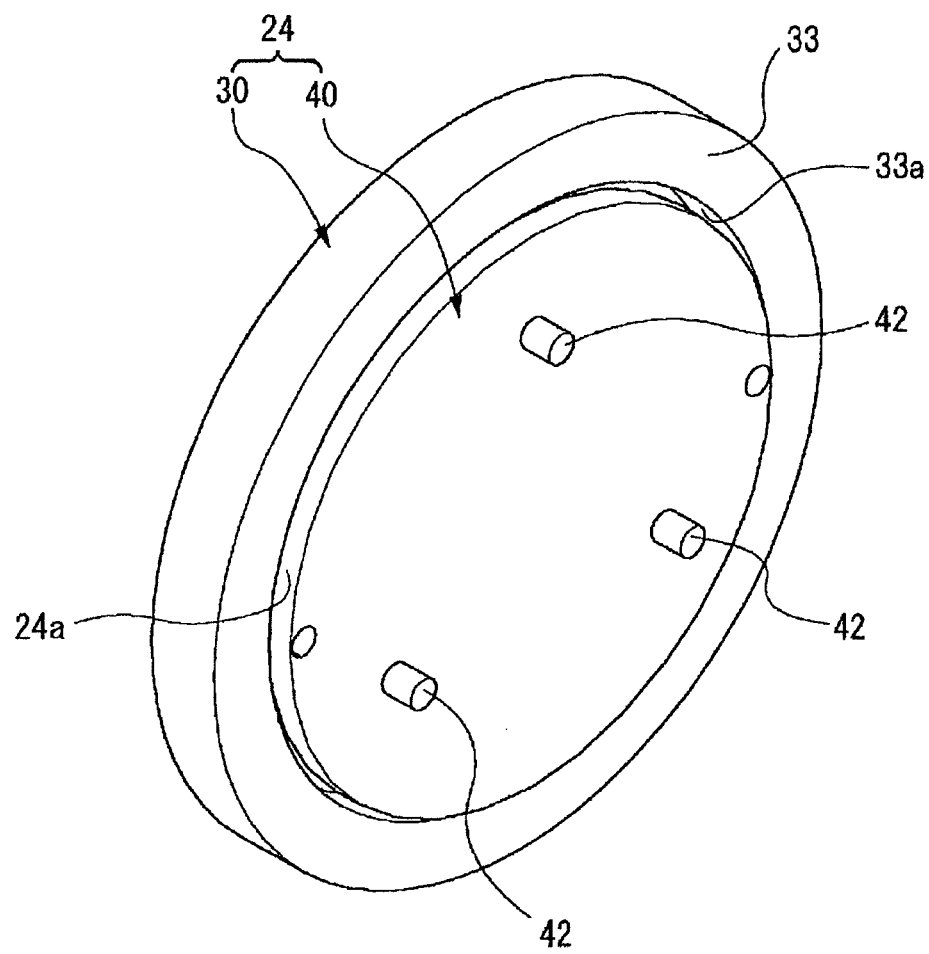
FIG. 6 is a perspective view showing the mixing unit of the first embodiment.
Figure 7:
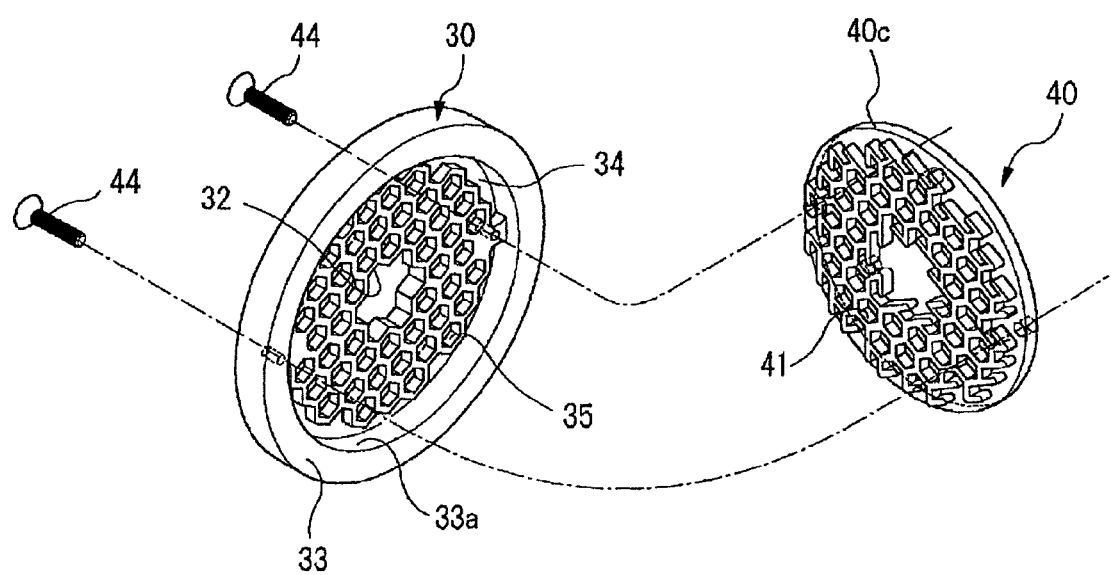
FIG. 7 is an exploded perspective view showing an assembling state of the mixing unit of the first embodiment.

Further, both of the mixing elements 30, 40 are assembled in the layouts as shown in FIGS. 6 and 7. Specifically, the second mixing element 40 is positioned in a face-to-face manner in a recessed part 34 of the first mixing element 30. At this time, the orientation of the second mixing element 40 is determined (see FIG. 7) so that opening faces of a number of honeycomb-shaped recessed parts 35 of the downstream side face 31b of the first mixing element 30 is abuts in a face-to-face manner against those of a number of honeycomb-shaped recessed parts 41 of the upstream side face 40a of the second mixing element 40. If the second mixing element 40 is oriented in this way, a face having the protrusion 42 formed thereon can be seen from the outside (see FIG. 6). In this state, the through hole 36 of the first mixing element 30 and the screw hole 43 of the second mixing element 40 are positionally aligned with each other, and these mixing elements are assembled by tightening them with a screw 44.

As shown in FIG. 6, the diameter of the second mixing element 40 is smaller in size than that of the recessed part 34 of the first mixing element 30. However, it should be noted that there is a slight difference in diameter.

Therefore, upon assembling both of the mixing elements 30, 40, between an inner circumferential face 33a of the circumferential wall portion 33 of the first mixing element and an outer circumferential end face 40c of the second mixing element 40, a ring-shaped gap is formed as an annular outflow path 24a all around the outer circumferential end face of the second mixing element 40; and a dead end opening portion positioned at the downstream side of the annular outflow path 24a is a flow outlet for fluid R, and is opened in a ring shape toward the downstream side.

The fluid R fed to the flow inlet 32 of the first mixing element 30 passes through a mixing flow path 25 to be described later (see FIG. 2), and then, is discharged from this flow outlet. A discharge width "t" of the annular discharge canal 24a is formed at substantially regular intervals (substantially equally in width) all around there, and is formed in width of the order of ½₀ of the radius of the second mixing element 40 (more specifically, of the order of 1.5 mm) (see FIG. 8).

If the flow outlet of the annular outflow path 24a all around the outer circumference of the second mixing element 40 is formed substantially equally in width, a fluid R can be discharged substantially equally all around it. Thus, dispersion hardly occurs to a pressure of the fluid R to be flown out from the flow outlet, and a disadvantage is prevented such that a bias of the discharge amount of fluid occurs depending upon the position of the outer circumferential part of the mixing unit 24. If the bias of the discharge amount is prevented, a discharge canal resistance is lowered, and the emersion of a location in which the pressure of the fluid R becomes locally high is prevented.

In addition, in the embodiment, the size of the annular outflow path 24a, i.e., the width "t" of a gap becomes substantially equal all around there. In this manner, the discharge canal resistance can be lowered more reliably, and the occurrence of a local high-pressure region, in particular, the occurrence of a local high-pressure region in the vicinity of the annular outflow path 24a can be prevented.

Hereinafter, a description will be given with respect to a correlation of a number of honeycomb-shaped recessed parts 35, 41, to be formed on the abutment-side face of each of the mixing elements 30, 40.

Figure 8:
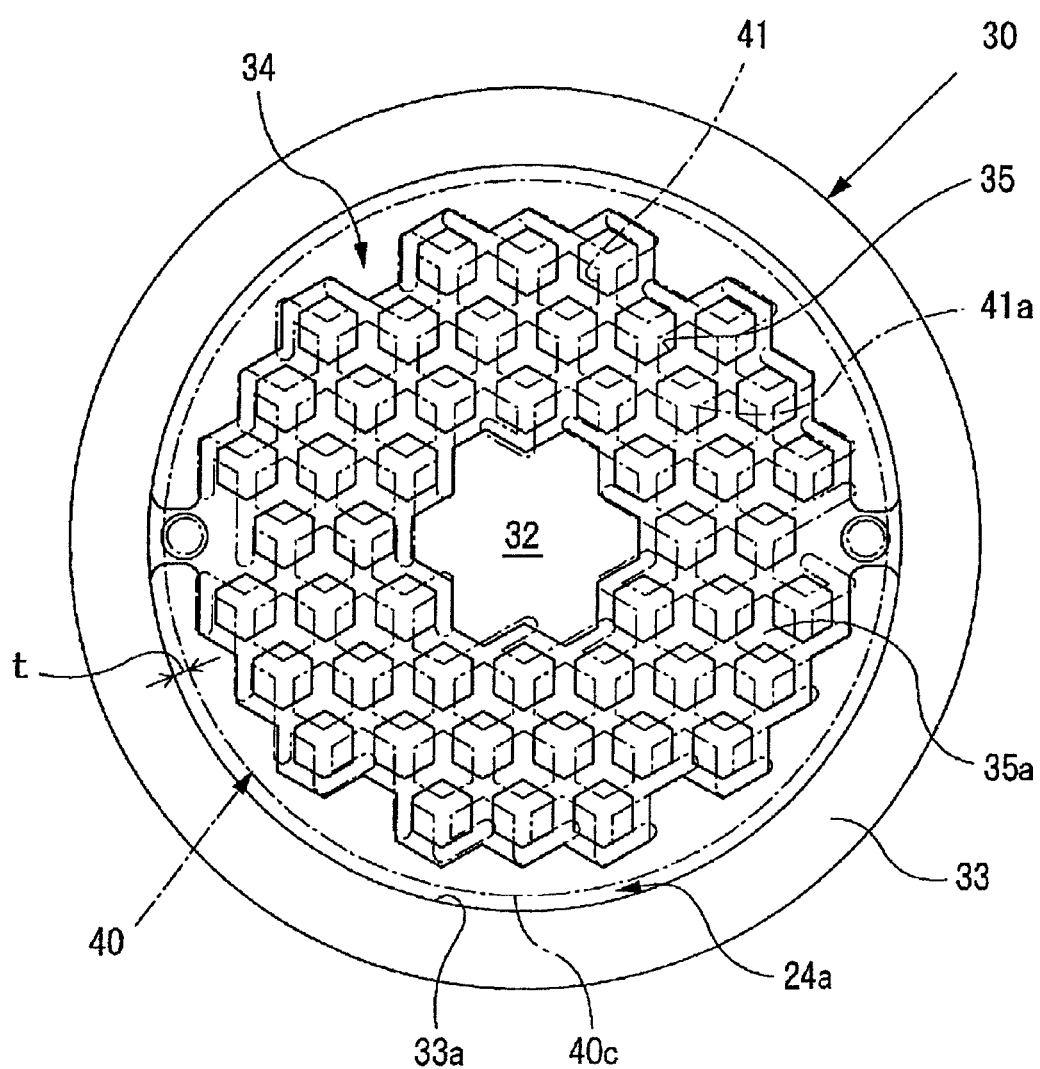
FIG. 8 is a schematic view showing an abutment state of a recessed part formed at each mixing element of the first embodiment.

As shown in FIG. 8, abutment faces of both of the mixing elements 30, 40 abut against each other while the rectangular portion 41a of the recessed part 41 of the second mixing element 40 is positioned at a center position of the recessed part 35 of the first mixing element.

If these faces are thus abutted against each other, a fluid R can be flown between the recessed part 35 of the first mixing element 30 and the recessed part 41 of the second mixing element 40. In addition, the rectangular portion 41a is positioned where the rectangular portions 41a of the three recessed parts 41 gather.

Therefore, a fluid R is diverted to two discharge canals in consideration of a case in which the fluid flows from the side of the recessed part 35 of the first mixing element 30 to the side of the recessed part 41 of the second mixing element 40.

Namely, the rectangular portion 41a of the second mixing element 40, which is positioned at the center position of the recessed part 35 of the first mixing element 30, functions as a diverting portion for diverting a fluid R into two ways. Conversely, the fluid R having flown out of the two ways flows into one recessed part 35, and is merged in consideration of a case in which the fluid R flows from the side of the second mixing element 40 to the side of the first mixing element 30. In this case, the rectangular portion 41a positioned at the center position of the second mixing element 40 functions as a converging portion.

In addition, the rectangular portion 35a of the recessed part 35 of the first mixing element 30 is positioned at a center position of the recessed part 41 of the second mixing element 40 as well. In this case, the rectangular portion 35a of the first mixing element 30 functions as the above-described diverting section or converging section.

In this manner, between the mixing elements 30 and 40 that are disposed to be face-to-face opposed to each other, there is formed a mixing flow path 25 (see FIG. 2) in which the fluid R fed from a center flow inlet 32 in the axial direction of both of the mixing elements 30, 40 (casing main body 21) flows in a meandering manner in the radiation direction (radial direction orthogonal to the axial direction) of both of the mixing elements 30, 40, repeating diversion and confluence (dispersion and mixing).

In the course of fluid R flowing through the mixing flow path 25, mixing treatment is applied to the fluid R. The fluid R having passed through the mixing flow path 25 is then flown out of a flow outlet of the annular discharge canal 24a opening in a ring shape toward the downstream side at the outer circumferential part at the rear side of the mixing unit 24 to the outside of the mixing unit 24.

As shown in FIG. 2, the fluid mixer 11 of the embodiment allows five mixing units 24 to be set up in the casing main body 21. When a plurality of mixing units 24 are set up, the protrusion 42 of the second mixing element 40 of the mixing unit 24 that is positioned at the upstream side abuts against the upstream side face 31a (of the element main body 31) of the first mixing element 30 of the mixing unit 24 set up at the downstream side.

In this manner, a disk-shaped, flow path forming space S is acquired as the one formed by means of the mixing units 24, 24, both of which are disposed adjacent to each other, and the casing main body 21; and a collecting flow path 26 is acquired for flowing the fluid having flown out of the flow outlet of the annular outflow path 24a to the flow inlet 32 of the mixing unit 24 at the downstream side through the flow path forming space S.

In this manner, in the flow path forming space S, the fluid R having passed through the mixing flow path 25 is adapted to flow out from the entire circumference of the flow outlet opening at substantially equal width in a ring shape into the flow path forming space S having its extended width. The fluid R is flown out from the flow path having its substantially equal width and the diameter-extended flow path; and therefore, a significant effect of pressure loss reduction is attained.

The protrusion 42 of the second mixing element 40 of the mixing unit 24 disposed at the most downstream side abuts against the capping member 23 at the downstream side of the casing main body 21.

In this manner, the flow path forming space S, formed by means of the mixing unit 24, the capping member 23, and the casing main body 21, is acquired; and a collecting flow path 26 is acquired for flowing the fluid R having flown out of the annular outflow path 24a of the mixing unit 24 at the most downstream side to the fluid lead-out port 23a of the downstream side of a casing main body 21 through the flow path forming space S.

A description will be furnished as to a case of applying mixing treatment to the fluid R by employing the static fluid mixer 10. Hereinafter, a description will be furnished by way of example of a case in which the static fluid mixer 10 is employed as a static air bubbles generator for applying mixing treatment to a gas-liquid mixture fluid.

In the case where the static fluid mixer 10 is employed as a static air bubbles generator, a fluid introducing pipe 13 as a gas-liquid mixture supply pipe is connected to a fluid introducing port 11a of the static fluid mixer 10. Here, a description will be furnished as to a case of supplying a gas-liquid mixture fluid of water and air.

First, a first pump 12, which is a cavitation pump shown in FIG. 1, is actuated; the fluid R targeted for treatment is formed as a gas-liquid mixture fluid with gaseous air and liquid water being mixed with each other, and the fluid is supplied to the fluid introducing port 11a of the fluid mixer 11.

As shown in FIG. 2, the gas-liquid mixture fluid fed to the fluid mixer 11 is then flowed into the flow inlet 32 of the first mixing element 30 of the first mixing unit 24 disposed at the most upstream side in the casing main body 21, and is fed to the mixing flow path 25 of the first mixing unit 24.

The gas-liquid mixture fluid fed to the mixing flow path 25 flows in the annular outflow path 24a formed at the outer circumferential side of the mixing unit 24 while repeating diversion and confluence. Namely, flowage occurs while meandering in the course of repeating diversion and confluence; and therefore, schematically, mixing treatment is applied to the gas-liquid mixture fluid in the course of repeating diversion and confluence while flowage occurs in the radial-spreading direction from the center of the disk-shaped mixing unit 24 to the outer circumferential side. At this time, air bubbles are generated in such a manner that the air in the gas-liquid mixture fluid is fine (from nano-level to several nano-microns level) and is uniform in size.

The fluid having flown out of the annular outflow path 24a of the first mixing unit 24 flows through the collecting flow path 26 between the first mixing unit 24 and the second mixing unit 24 disposed at the downstream thereof, and is fed to the flow inlet 32 of the second mixing unit 24. The flow of the fluid R in each of the mixing units 24 is similar to that of the fluid R in the first mixing unit 24, a duplicate description of which is omitted here. A plurality of mixing units 24 are set up, and diversion and confluence is repeated, whereby fluid mixing treatment is applied more reliably, allowing air bubbles, which are finer and more uniform in particle size, to be generated in the fluid.

In addition, the following treatment may be performed. In FIG. 1, a first three-way valve 13a is manipulated to be opened/closed so that the fluid led out of the fluid lead-out port 11b of the fluid mixer 11 flows into a return pipe 15 and a second three-way valve 14a is manipulated to be opened/closed so that the fluid of the return pipe 15 flows into the fluid introducing pipe 13.

Further, a second pump 16 is actuated so as to circularly feed fluid to the fluid mixer 11. By doing this, the number of times of fluid mixing treatment can be increased as required; and therefore, fluid mixing treatment is applied more reliably, allowing air bubbles, which are further ultra-fine and are further uniform in size, to be generated in the fluid R.

Further, after circulated for a required period of time, the treatment fluid is led out from the fluid lead-out pipe 14 by manipulating the three-way valves 13a, 14a.

Here, a total number of diversions is determined depending upon: the number of recessed parts 35, 41 formed in mixing elements 30, 40; the number of mixing units 24 set up in the casing main body 21 of the fluid mixer 11; and the number of repetitions indicating how many times the fluid is circulated for the fluid mixer 11.

For example, a summed total number of diversions reaches 1,500 times to 1,600 times, if the recessed parts 35, 41 have hexagonal openings seen in a plan view, in the case where the first mixing element 30 shaped like three columns in which the numbers of chambers in the recessed parts are 12 chambers, 18 chambers, and 18 chambers (a total of 48 chambers) is superimposed on the second mixing element 40 shaped like two columns in which the numbers of chambers are 15 chambers and 15 chambers (a total of 30 chambers). The total number of diversions used herein designates the number of diversions at the diverting section of the mixing flow path 25 that is formed between the first mixing element 30 and the second mixing element 40.

[Static Fluid Mixer of Second Embodiment]

Next, a static fluid mixer 10A of a second embodiment will be described in detail, referring to FIGS. 9 to 13.

Figure 11A:
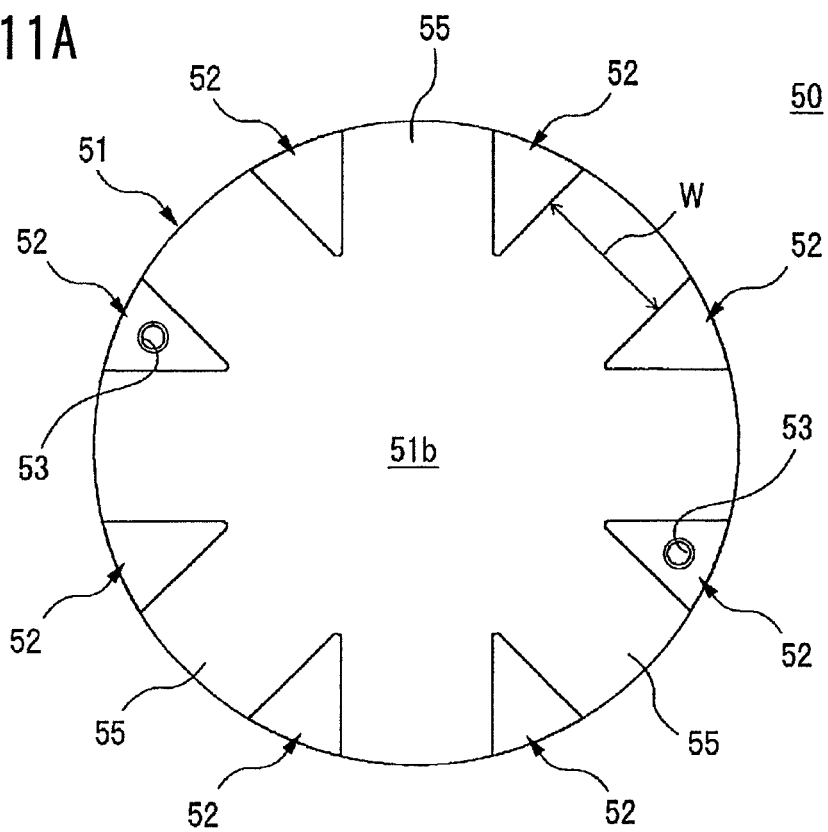
FIG. 11A is a right side view showing a collecting-flow-path forming element of the mixing unit of the second embodiment.
Figure 11B:
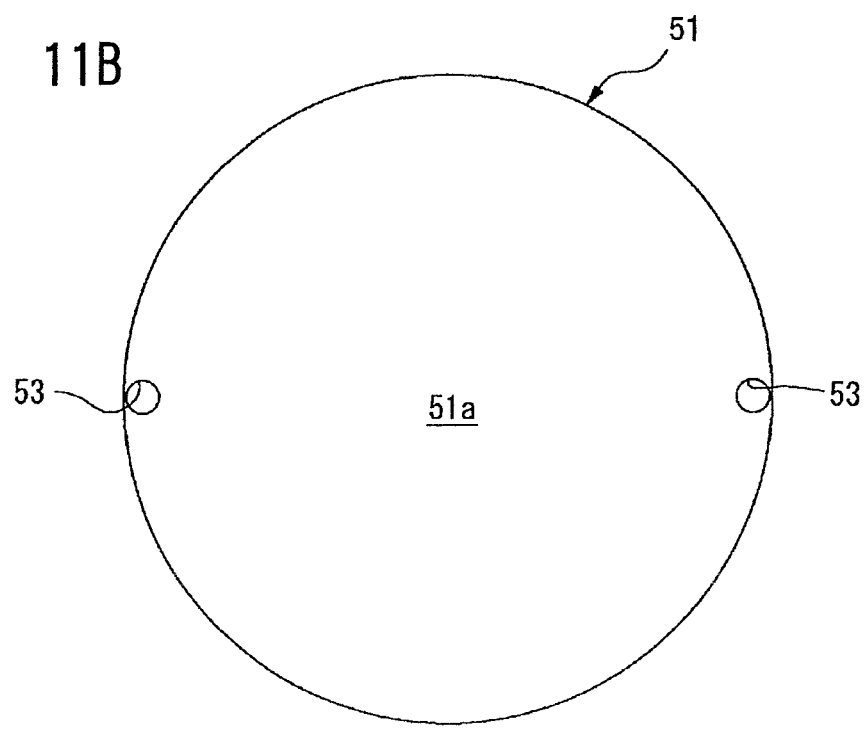
FIG. 11B is a left side view showing the collecting-flow-path forming element of the mixing unit of the second embodiment.

Unlike the mixing unit 24 of the first embodiment, a fluid mixer 11A of a static fluid mixer 10A of the second embodiment has guide members 52 at a collecting flow path 26 through which the fluid having flown out from an annular outflow path 24a of the mixing unit 24A flows (see FIG. 11). Like constituent elements of the static fluid mixer 10 of the first embodiment are designated by like reference numerals, and a duplicate description thereof is omitted.

Figure 9:
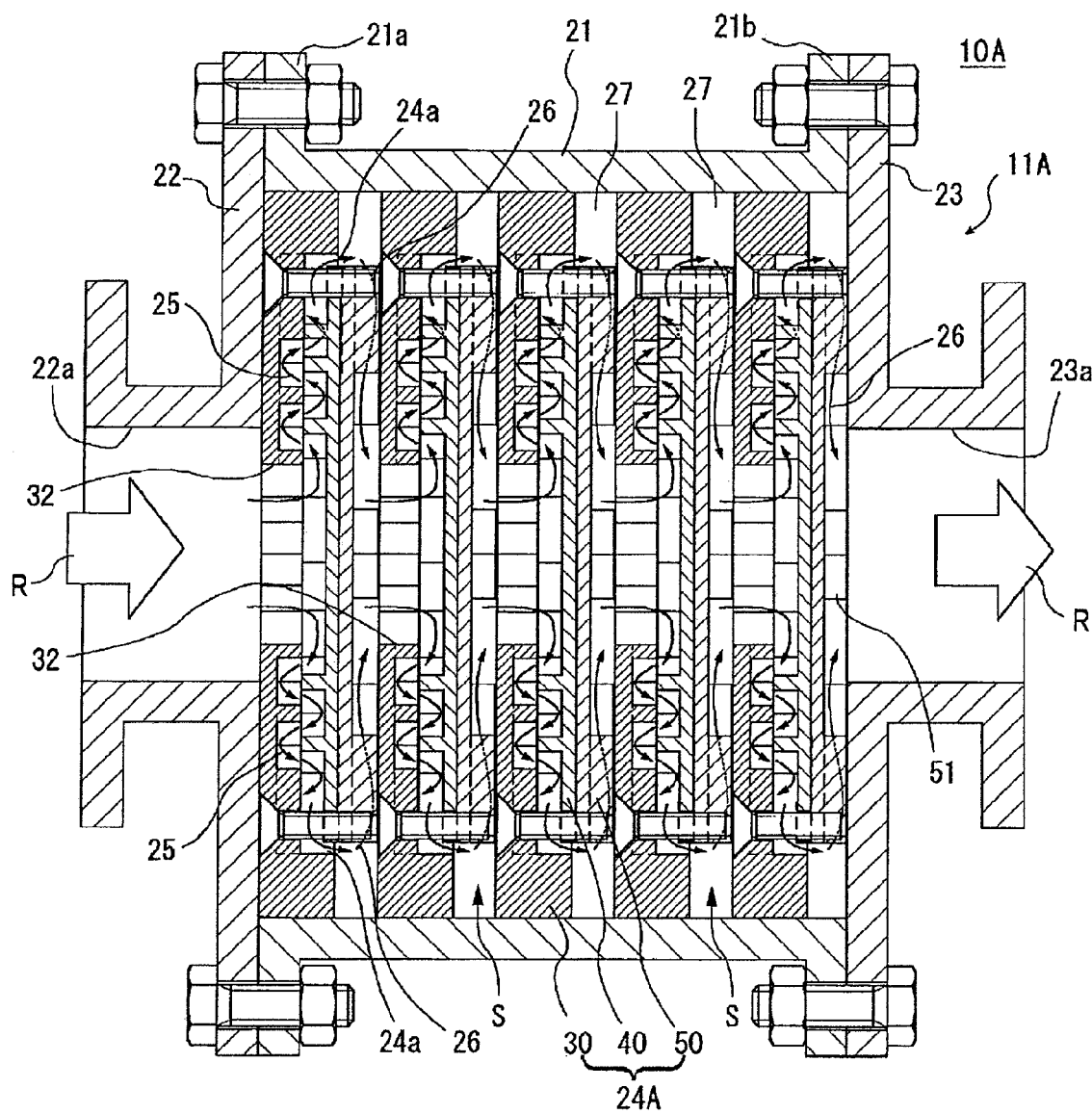
FIG. 9 is a sectional front view showing a fluid mixer of a second embodiment.

As shown in FIG. 9, the mixing unit 24A of the fluid mixer 11A of the embodiment is provided with a collecting-flow-path forming element 50 which comprises a guide member 52 which is a member of stabilizing a flow-path sectional area of the collecting flow path 26, in addition to the first mixing element 30 and the second mixing element 40.

Figure 10:
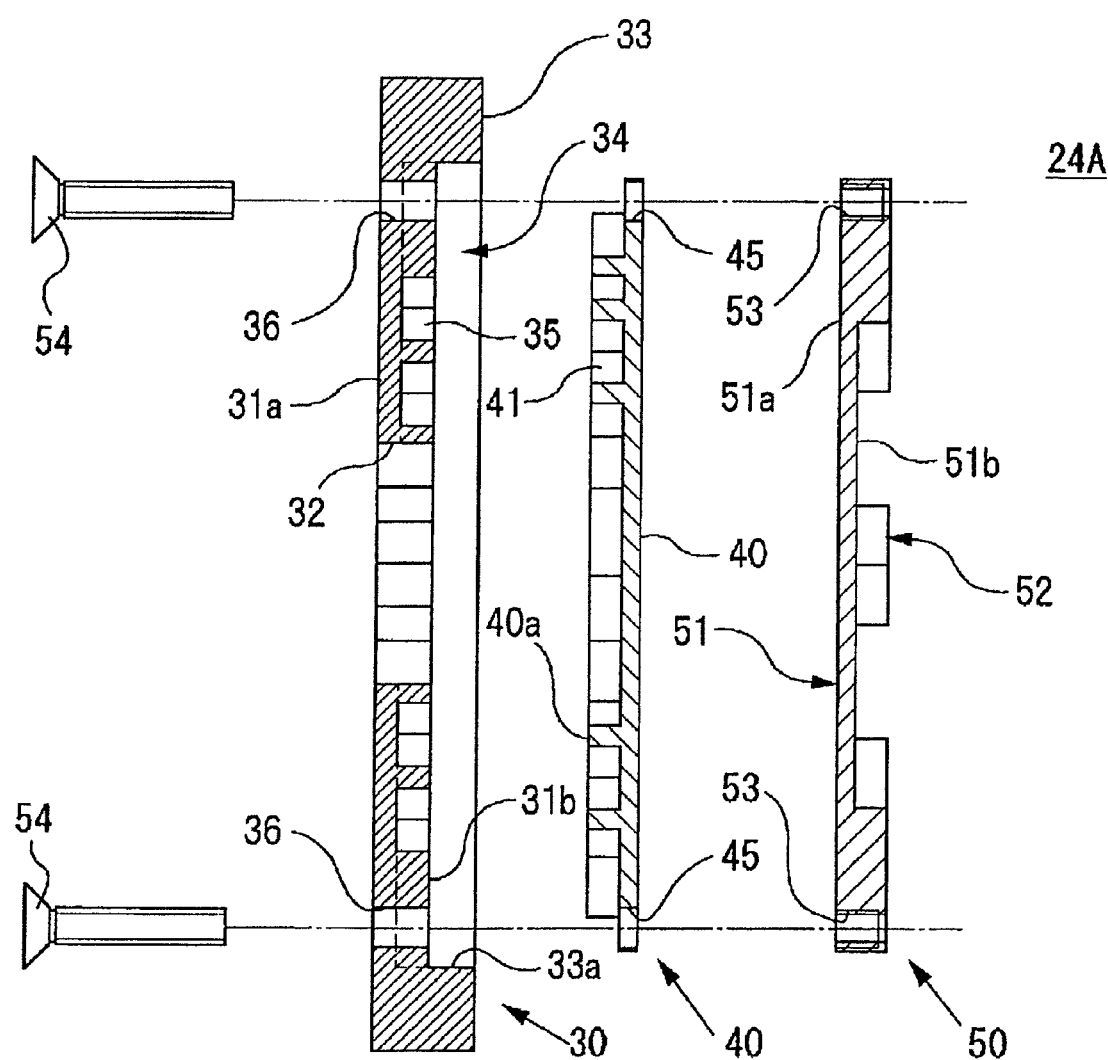
FIG. 10 is an exploded sectional front view showing a mixing unit of the fluid mixer of the second embodiment.

Among them, the second mixing element 40 is not provided with the protrusion 42, unlike the one of the first embodiment. Namely, a downstream side face 40b, which is oriented toward the fluid lead-out port of the second mixing element 40, is formed in a planar shape. Other constituent elements are the same as those of the second mixing element 40 of the first embodiment. In FIG. 10, reference numeral 45 designates a through hole of a screw employed to fix the second mixing element 40 to the first mixing element 30 by means of screw-tightening.

Figure 13:
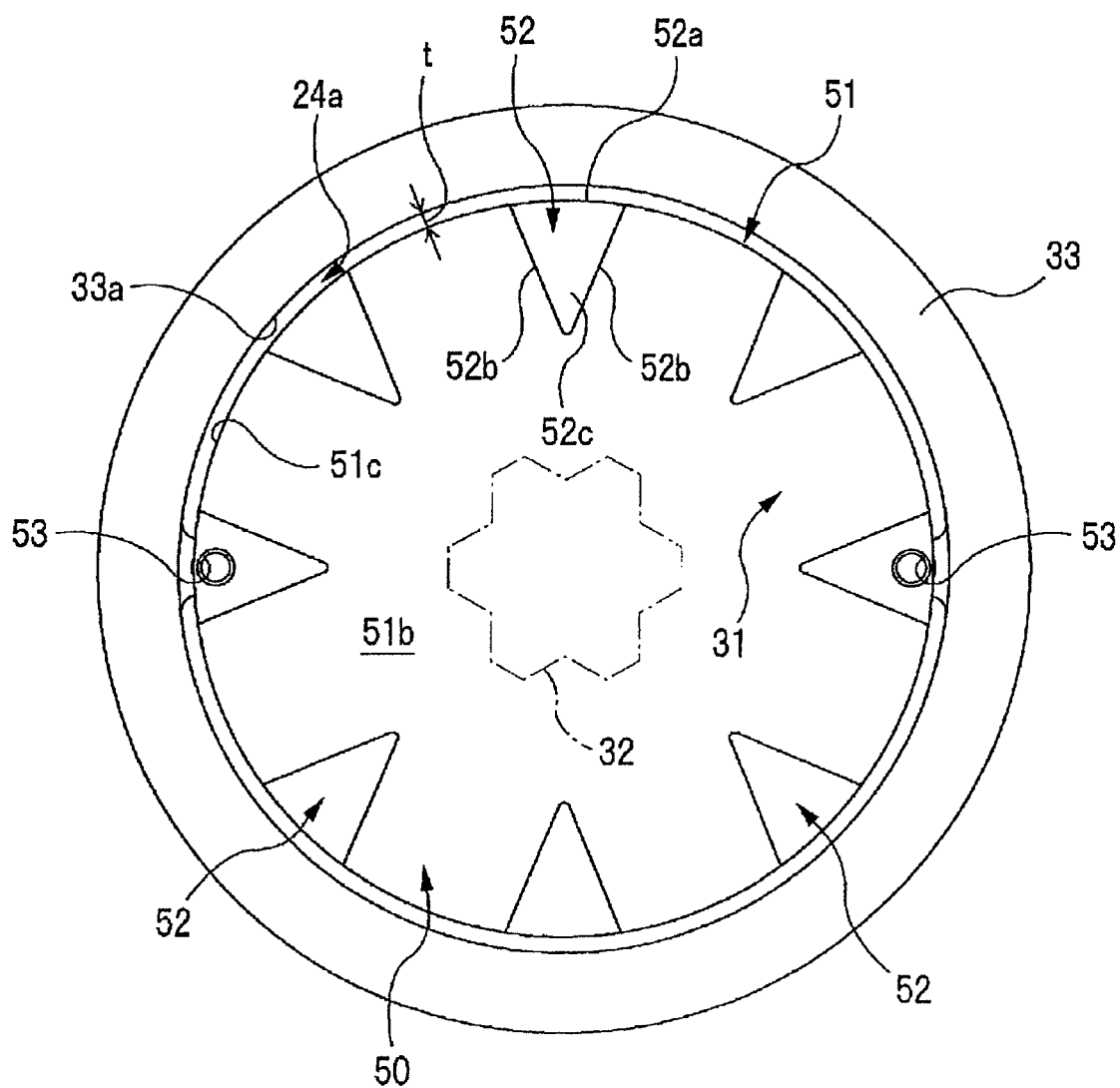
FIG. 13 is a right side view showing the collecting-flow-path forming element of the mixing unit of the second embodiment.

As shown in FIGS. 11 and 13, a collecting-flow-path forming element 50 allows the guide member 52 to be provided at the circumferential edge part of the downstream side face 51b which is one side of an element main body 51 formed in the same diameter as that of the second mixing element 40 and in a thin disk shape.

In addition, an upstream side face 51a coming into facial contact with another one, which is oriented toward the second mixing element 40 while set up in the casing main body 21, is formed in a planar shape. Further, a plurality of protrusive guide members 52 (eight pieces in the embodiment) are integrally formed at the circumferential edge part of the downstream side face 51b oriented toward the fluid lead-out port 23a.

The guide member 52 is a planar member formed to be substantially shaped like a fan from: an outer circumferential arc face 52a formed on an arc face whose curvature is the same as that of the outer circumferential edge of the second mixing element 40; one pair of side faces 52b, 52b that is connected to be extended from both ends of the outer circumferential arc face 52a to the center side of the element main body 51; and an abutment face 52c formed as a plane being parallel to the element main body 51. An angle (apex angle) formed by one pair of the side faces 52b, 52b is set at 45 degrees, and an extended width of the side face 52b is set to be substantially ⅓ of the radius of the element main body 51.

At the circumferential part of the element main body 51 of the embodiment, a total of eight guide members 52 are disposed at equal intervals in the circumferential direction. In addition, the guide members 52 are formed so that: the outer circumferential arc face 52a is flush with the outer circumferential end face of the collecting-flow-path forming element 50 and that of the second mixing element 40; and the side faces 52b, 52b, which are opposite to each other, of the guide members 52 adjacent to each other, are parallel to each other in the circumferential direction.

Therefore, a groove portion 55 formed of the side faces 52b, 52b, of the guide members 52, 52 adjacent to each other, and the downstream side face 51b, allow width W of the groove portion to be constant and equal from the circumferential side to the center side of the collecting-flow-path forming element 50. Reference numeral 53 designates a screw hole formed to mount a female screw employed to integrally fix the collecting-flow-path forming element 50 to the first mixing element 30 and the second mixing element 40 by means of screw-tightening.

The mixing units 24A comprising the collecting-flow-path forming element 50 are assembled as shown in FIG. 9.

Figure 12:
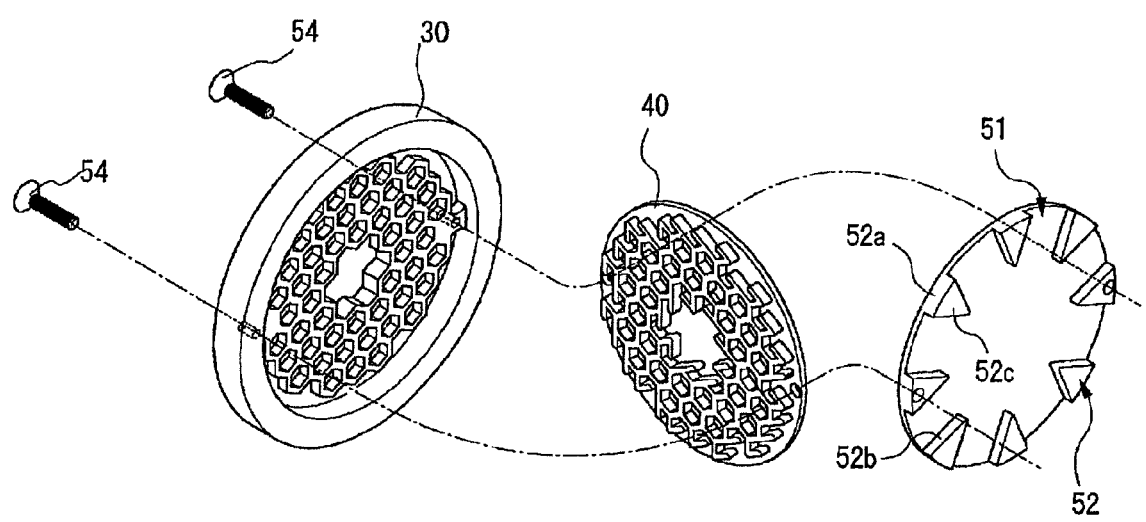
FIG. 12 is an exploded perspective view showing an assembling state of the mixing unit of the second embodiment.

First, like the first embodiment, the second mixing element 40 is assembled with the first mixing element 30, and the collecting-flow-path forming element 50 is disposed so as to be superimposed on the second mixing element 40 (see FIGS. 10 and 12).

At this time, a planar downstream side face 40b of the second mixing element 40, which is oriented to the outside, is bought into facial contact with a planer upstream side face 51a of the collecting-flow-path forming element 50.

A face having the guide member 52 of the collecting-flow-path forming element 50 formed thereon is then oriented to the downstream side.

In this state, the through holes 36, 45 of the mixing elements 30, 40, respectively, and the screw hole 53 of the collecting-flow-path forming element 50, are positionally aligned, and these mixing elements are assembled after tightened with a screw 54.

In addition, as shown in FIG. 9, the fluid mixer 11A of the second embodiment allows five mixing units 24A to be set up in the casing main body 21. When a plurality of mixing units 24A is set up, the abutment face 52c of the guide member 52 that is provided at the collecting-flow-path forming element 50 of the mixing unit 24A that is positioned at the upstream side abuts against the upstream side face 31a of the first mixing element 30 of the mixing unit 24A that is positioned at the downstream side.

In this manner, a flow path forming space S for the thickness of the guide member 52 is retained between the mixing units 24A, which are disposed adjacent to each other, and the casing main body 21; and a collecting flow path 26 is acquired for flowing the fluid having flown out from the flow outlet of the annular flow outlet 24a to a flow inlet 32 or a flow lead-out port 23a of the mixing unit 24A of the downstream side.

Here, in the flow path forming space S, eight guide members 52 stabilizing a flow path sectional area are arranged in the vicinity of a flow outlet opening in a ring shape and at the axial core side of the casing main body 21; these guide members 52 are disposed at intervals in its circumferential direction along the flow outlet, whereby a collecting flow path 26 is formed between the adjacent guide members 52, 52, whereas an annular communication path 27 extending in the circumferential direction along the flow outlet is formed at the inner circumferential face side of the casing main body 21. At this time, a leader part of the collecting flow path 26 is connected to the inner circumferential face side of the annular communication path 27, and the collecting flow path 26 is allowed to communicate to the flow outlet via the annular communication path 27.

In this manner, the fluid R having passed through the mixing flow path 25 is flown out from the entire circumference of the flow outlet opening at substantially equal width in a ring shape to the diameter-extended flow path forming space S so that the fluid R is flown out from the flow path of its substantially equal width to the diameter-extended flow path; and therefore, a significant effect of pressure loss reduction is attained. In addition, the fluid R having flown out from the flow outlet onto an outer circumferential arc face 52a of the guide member 52 is flown smoothly to the leader side of the nearest collecting flow path 26, through the annular communication path 27 communicating with each collecting flow path 26 extending annularly in the circumferential direction. The fluid then flows down the collecting flow path 26, and reaches the flow inlet 32 or fluid lead-out port 23a. At this time, as shown in FIGS. 9 and 11, in the collecting-flow-path forming element 50, a groove part 55 formed between the guide members 52, 52 adjacent to each other is uniform in its width dimensions, as described above.

Therefore, when an abutment face 52c of the guide member 52 is abutted against an upstream side face 31a of a first mixing element 30 of the downstream side, a collecting flow path 26, a flow path cross section of which is shaped like an elongated square in the circumferential direction, is formed between the groove part 55 and the upstream side face 31a of the first mixing element 30. In addition, in the collecting flow path 26, its flow path sectional shape and flow path sectional area are substantially uniform from the inner circumferential face side to the axial core side (center side) of the casing main body 21, which is in the collecting flow direction; and the groove parts 55 are formed at least uniform intervals. Further, the guide members 52 are adapted to rectify the flow of fluid, and the guide members 52 are provided, thereby allowing the fluid to smoothly flow.

If the guide members 52 are not present, the collecting flow path 26 becomes greater in sectional area of the flow path, as the inner circumferential face side of the casing main body approaches more, whereas the flow path sectional area becomes more rapidly smaller, as the axial core side (center side) approaches more. A structure in which the flow path sectional area rapidly increases or decreases causes a flow path resistance, or alternatively, causes the generation of a portion at which the fluid becomes locally high in pressure. If the flow path resistance increases, the fluid pressure becomes higher and the flow rate is lowered. In addition, if a high-pressure location is locally generated, the leakage of fluid occurs therefrom.

In this point of view, in the fluid mixer 11A of the embodiment, eight guide members 52 are provided at constant intervals in the circumferential direction at the circumferential edge part of the element main body 51; and eight groove portions 55 forming the collecting flow path 26 is formed in a radiation shape, allowing the flow path sectional area in the collecting flow direction of the collecting flow path 26 to be stabilized in a uniform state.

Therefore, the fluid having flown out of the flow outlet of the ring-shaped annular outflow path 24*a* flows out of the outer circumferential edge part of the element main body 51 into the leader part (upstream side part) of the nearest one of the collecting flow paths 26 equally disposed in the circumferential direction. However, if the flow path sectional area of this collecting flow path 26 is stable up to the vicinity of the flow inlet 32 or flow lead-out port 23*a* which is the downstream side, an occurrence of a failure is prevented such that the generation of a location in which the flow path resistance is lowered, or alternatively, the fluid pressure becomes locally high is prevented.

Figure 14A:
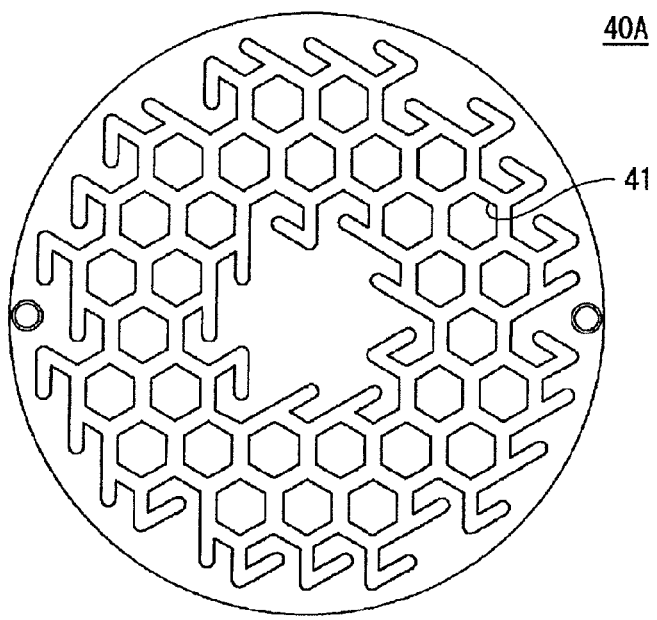
FIG. 14A is a left side view showing a modified second mixing element of the second embodiment.
Figure 14B:
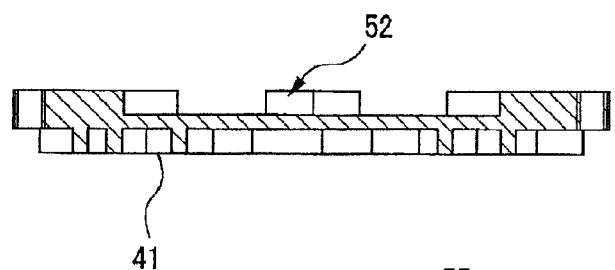
FIG. 14B is a landscape view of a front view showing the modified second mixing element of the second embodiment.
Figure 14C:
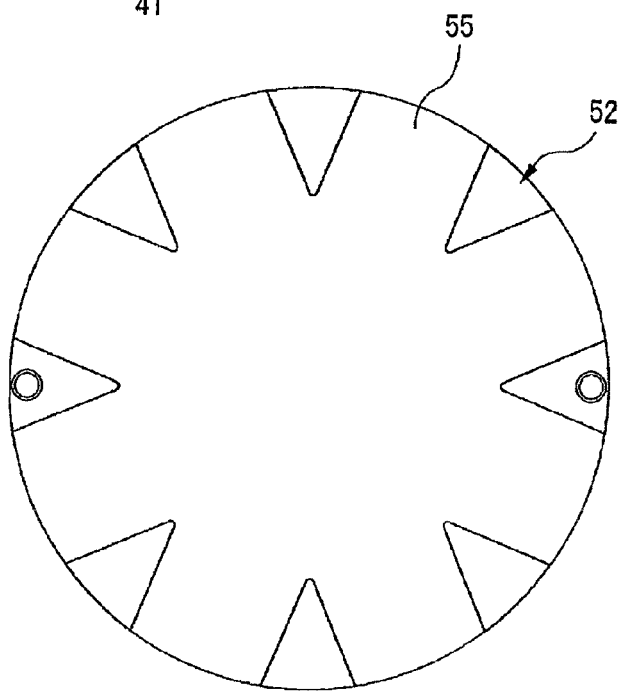
FIG. 14C is a right side view showing the modified second mixing element of the second embodiment.

In addition, in the second embodiment described so far, the guide members 52 are formed at the collecting-flow-path forming element 50 which is independent of the second mixing element 40, whereas as shown in FIG. 14, the guide members 52, may be formed integrally with the second mixing element 40A.

In this case, there is no need for the element main body 51, and the miniaturization of the fluid mixer 11 can be achieved. In addition, the number of parts is reduced, thus facilitating assembling work. Easy maintenance in activities such as disassembling/assembling work is important, since there are quite a few opportunities of performing maintenance in equipment in which a flow path is comparatively narrow like the fluid mixer 11A of the embodiment.

Further, the guide members 52 that are included in the second mixing element 40A may also be employed as the protrusion 42 of the first embodiment. Therefore, there is an advantage that no protrusion needs to be provided aside from the guide members 52.

The method of generating air bubbles by employing the static fluid mixer 10A of the second embodiment itself is similar to the case of generating air bubbles by employing the static fluid mixer 10 of the first embodiment; and therefore, a duplicate description thereof is omitted here. This also applies for a third embodiment to be described subsequently.

[Static Fluid Mixer of Third Embodiment]

Next, a static flow mixer 10B of a third embodiment will be described referring to FIGS. 15-18. Like constituent elements of the static fluid mixer 10A of the second embodiment are designated by like reference numerals, and a duplicate description thereof is omitted here.

Unlike the fluid mixer 11A of the second embodiment, a fluid mixer 11B of the static fluid mixer 10B of the third embodiment is provided with a lead-out side element 60 which is disposed in opposite to the collecting-flow-path forming element 50, as a constituent element of the mixing unit installed in the casing main body 21.

Figure 16:
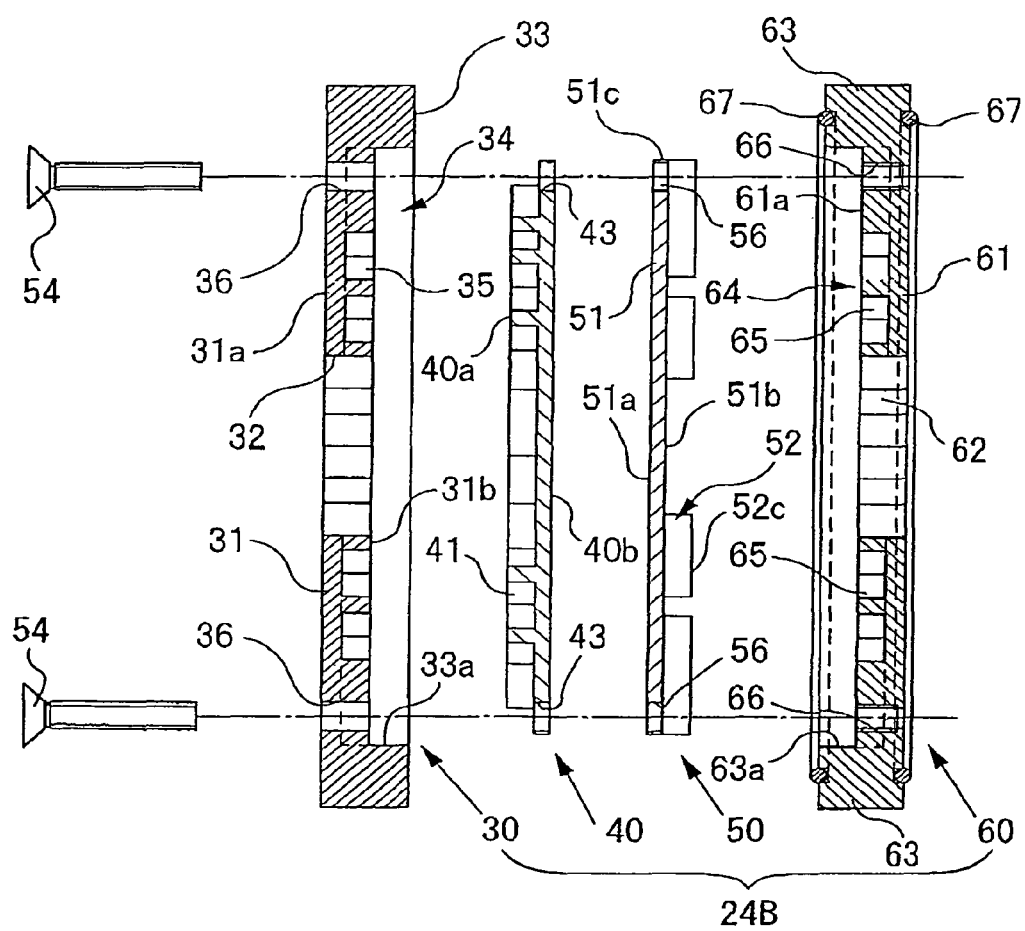
FIG. 16 is an exploded sectional front view showing a mixing unit of the fluid mixer of the third embodiment.

Specifically, as shown in FIG. 16, a mixing unit 24B of the fluid mixer 11B of the third embodiment is provided with: the lead-out side element 60 in addition to the first mixing element 30, the second mixing element 40, and the collecting-flow-path forming element 50, of the second embodiment.

The first and second mixing elements 30, 40 are the same as those of the second embodiment. In addition, as shown in FIG. 16, the collecting-flow-path forming element 50 of the embodiment is provided with a through hole 56 which is employed for the sake of screw-tightening in place of the screw hole 53 of the second embodiment. Other constituent elements are similar to those of the collecting-flow-path forming element 50 of the second embodiment.

As shown in FIG. 16, a lead-out side element 60 allows a fluid discharge port 62 for fluid R (indicated by the arrow in FIG. 15 or the like) is formed in a penetrative state at the center part of a disk-shaped element main body 61.

In addition, a thick circumferential wall portion 63 is formed in a protrusive shape at the upstream side all around the outer circumferential edge part of the element main body 61, and a recessed part 64 having a circular opening toward the upstream side is formed by means of the element main body 61 and the circumferential wall portion 63. Reference numeral 61*a* designates an upstream side face (whose side is opposite to the collecting-flow-path forming element 50) of the element main body 61.

Figure 18A:
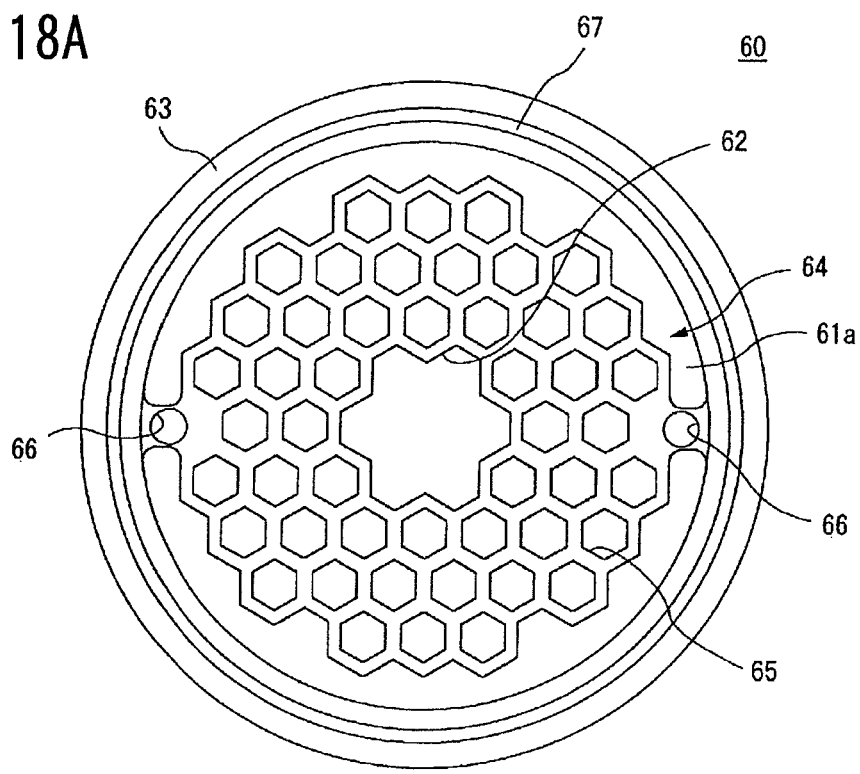
FIG. 18A is a left side view showing a lead-out side element of the mixing unit of the third embodiment.
Figure 18B:
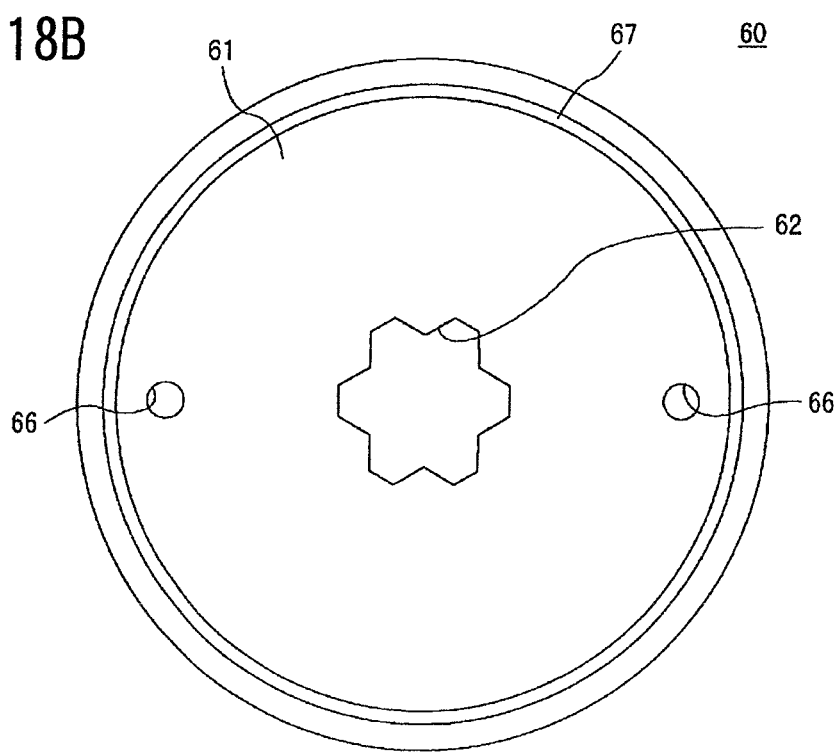
FIG. 18B is a right side view showing a lead-out side element of the mixing unit of the third embodiment.

As shown in FIG. 18, at an upstream side face 61*a* of the element main body 61, a plurality of recessed parts 65 whose opening is shaped like a regular hexagon are formed in a gapless manner. A number of recessed parts 65 are formed in a so called honeycomb shape. Reference numeral 66 designates a screw hole employed to fix the lead-out side element 60 to the first mixing element 30 or the like by screw-tightening.

Figure 17:
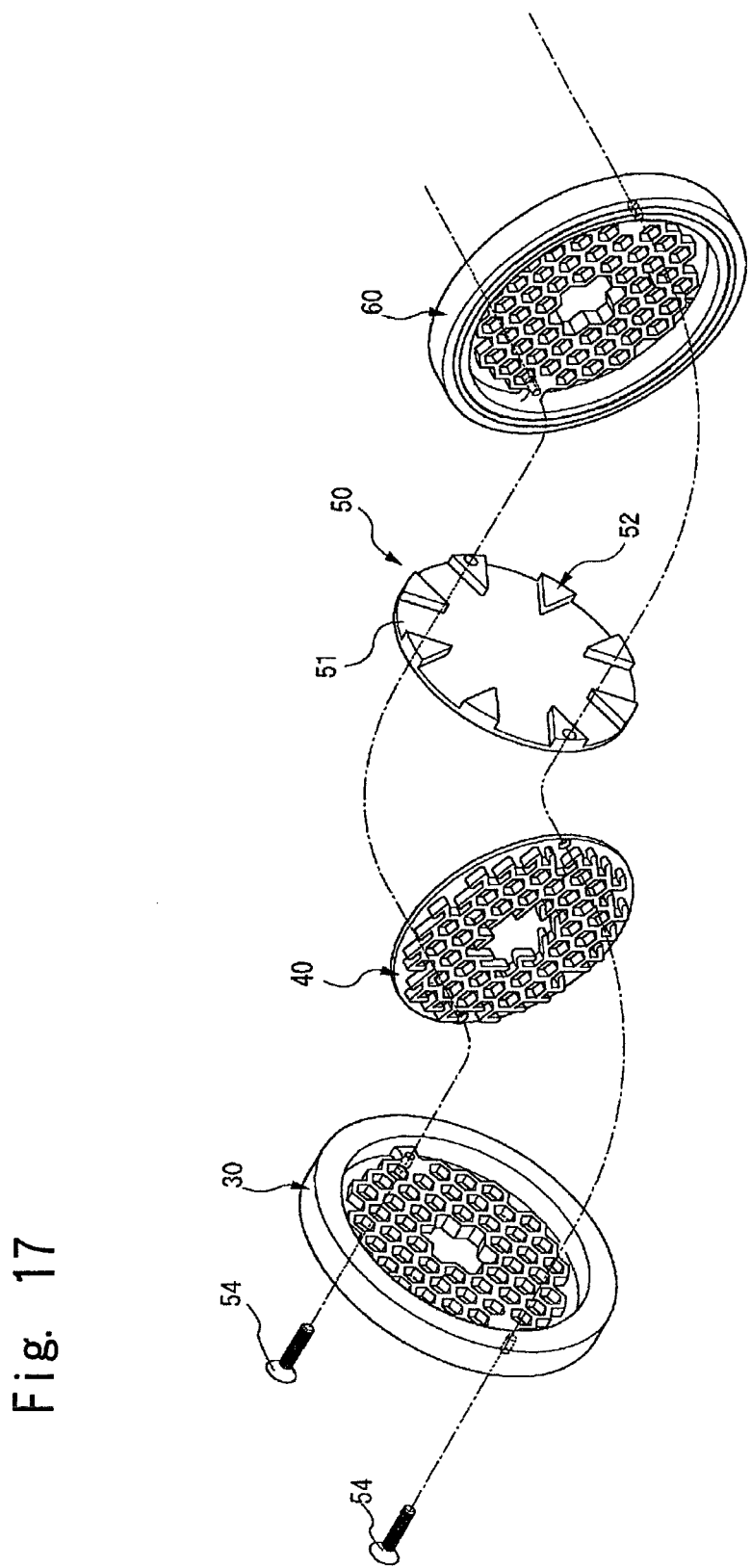
FIG. 17 is an exploded perspective view showing an assembling state of the mixing unit of the third embodiment.

As shown in FIGS. 16 and 17, the lead-out side element 60 forms the element main body 61 or the circumferential wall portion 63 whose diameter is substantially equal to that of the element main body 31 or that of the circumferential wall portion 33, of the first mixing element 30, allowing end faces of the circumferential wall portions 63, 33 to be face-to-face opposed to each other, via packing 67.

That is, the lead-out side element 60 is greater in size than the collecting-flow-path forming element 50. In addition, the diameter of the element main body 61 is greater than that of the element main body 51 so that the collecting-flow-path forming element 50 is accommodated to be engaged in the recessed part 64. However, it should be noted that there is a slight difference in diameter.

Therefore, upon assembling both of elements 50, 60, between an outer circumferential end face 51*c* of the collecting-flow-path forming element 50 and an inner circumferential face 63*a* of the circumferential wall portion 63 of the lead-out side element 60, a ring-shaped gap is formed as an inflow path 24*b* all around the outer circumferential end face of the collecting-flow-path forming element 50; and a leading edge opening portion positioned at the upstream side of the inflow path 24*b* is a flow inlet for fluid, and is opened in a ring shape toward the upstream side.

The inflow width of the inflow path 24*b* is formed to be equal all around there, and is formed to be on the order of 1/20 of the radius of the collecting-flow-path forming element 50, for example (more specifically, on the order of 1.5 mm).

The inflow path 24*b* is formed in diameter which is substantially equal to that of each of the collecting-flow-path forming element 50 and the second mixing element 40. In the embodiment, this inflow path is formed in diameter and width which is substantially equal to that of the annular outflow path 24*a* formed between the first and second mixing elements 30 and 40, and is disposed in opposite to each other in a face-to-face manner.

In addition, a flow outlet of the annular outflow path 24*a* and an flow inlet of the inflow path 24*b* are connected to each other, and a ring-shaped communication connecting path 68 is formed.

Moreover, in the communication connecting path 68, the flow outlet of the annular outflow path 24*a* opening in the ring shape toward the downstream side all around there and the flow inlet of the inflow path 24*b* opening in the ring shape toward the upstream side all around there are formed in proximity and face-to-face in a matched state, so that: a pressure loss of the fluid flowing through the annular outflow path 24a→the inflow path 24b→the collecting flow path 26 can be significantly lowered; the amount of treatment per a unit time can be increased; and fluid leakage from the packing 67 which is a sealing section can be reliably avoided.

Figure 15:
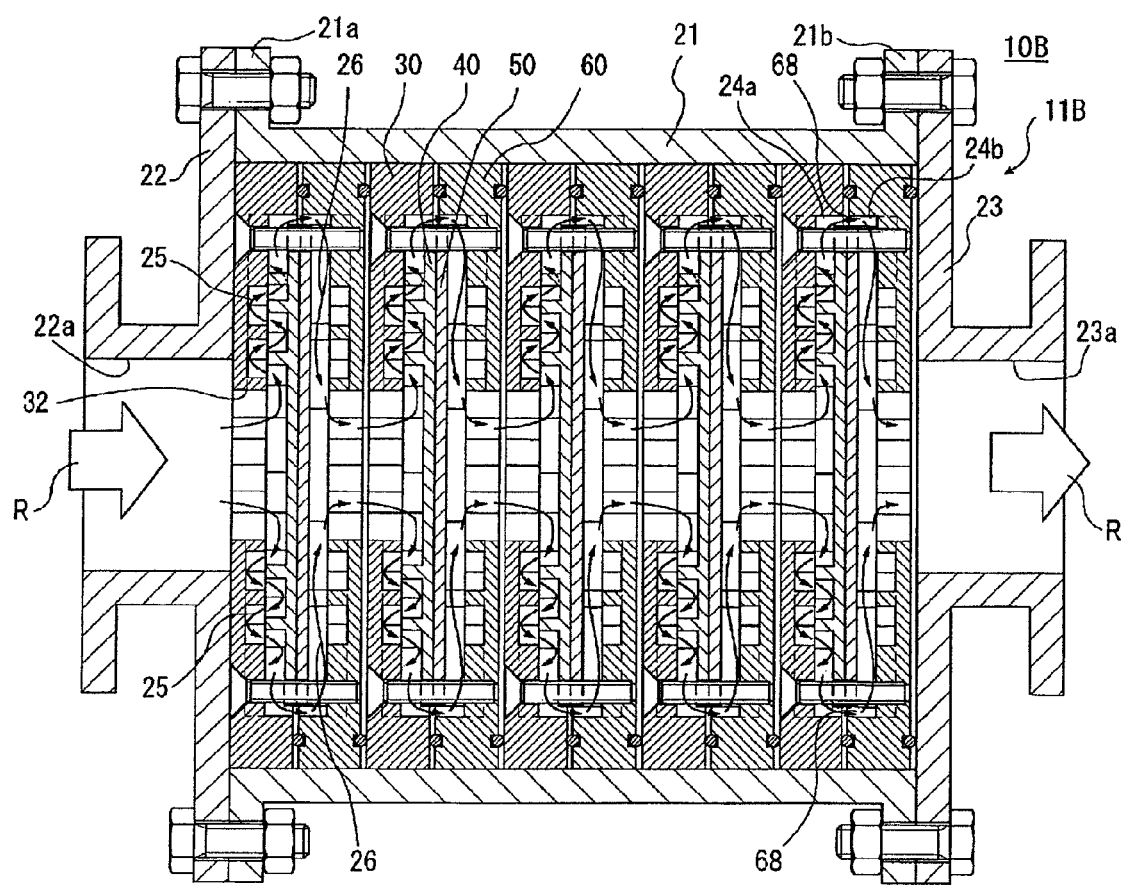
FIG. 15 is a sectional front view showing a fluid mixer of a third embodiment.

The mixing unit 24B is assembled in the layout as shown in FIGS. 15 to 17. Specifically, the second mixing element 40 is disposed in the recessed part 34 of the first mixing element 30, whereas the collecting-flow-path forming element 50 is disposed in the recessed part 64 of the lead-out side element 60.

At this time, the orientation of the second mixing element 40 is determined so that opening faces of a number of honeycomb-shaped recessed parts 35 of the downstream side face 31b of the first mixing element 30 abuts against that of a number of honeycomb-shaped, recessed parts 41 of an upstream side face 40a of the second mixing element 40 in a face-to-face state; and the orientation of each of the elements 30, 40, 50, 60 is determined so that opening faces of a number of honeycomb-shaped recessed parts 65 of the upstream side face 61a of the lead-out side element 60 abuts against the abutment face 52c of the guide member 52 of the collecting-flow-path forming element 50 in a face-to-face state (see FIG. 16).

In this state, a through hole 36 of the first mixing element 30; a screw hole 45 of the second mixing element 40; a through hole 56 of the collecting-flow-path forming element 50; and a screw hole 66 of the lead-out side element are positionally aligned with each other; and are assembled by screw-tightening them with a screw 54.

At this time, the end faces of the circumferential wall portion 63 of the lead-out side element 60 and the circumferential wall portion 33 of the first mixing element 30 are brought into intimate contact with each other in a face-to-face state, via the packing 67; and a gap 24a as a flow outlet and a gap 24b as a flow inlet, which is to be formed in a ring shape inward of both of the circumferential wall portions 33, 63 (mixing unit 24B), are caused to communicate with each other in an opposite state.

As a result, the fluid having flown out of the annular outflow path 24a flows from the inflow path 24b to the collecting flow path 26 that is formed between the collecting-flow-path forming element 50 and the lead-out side element 60.

In this way, the annular outflow path 24a is formed all around an outer circumference of the second mixing element 40 and the inflow path 24b is formed all around an outer circumference of the collecting-flow-path forming element 50, whereby fluid can be caused to outflow/inflow all around there, thus preventing a disadvantage such that a bias of the outflow amount of fluid occurs depending upon the position of the outer circumferential part of the mixing unit 24B.

The bias of the outflow amount is prevented, whereby a flow-path resistance is lowered, preventing the generation of a location in which the fluid pressure becomes locally high. In addition, in the embodiment, the sizes of the annular outflow path 24a and the inflow path 24b, i.e., the widths of gaps are substantially equal to each other all around there.

In this manner, the flow path resistance can be lowered more reliably, making it possible to prevent the generation of a local high-pressure area, in particular, the generation of a local high-pressure area in the vicinity of the flow outlet 24a and the flow inlet 24b.

In addition, with such a structure, a so called dead space in which fluid is prone to become stagnant partway of the fluid flow path is eliminated. If a dead space is present, fluid is prone to become stagnant in that space, and dispersion in quality of fluid mixing treatment (for example, the quality in the size of generated air bubbles or the like) is prone to occur.

In this point of view, in the embodiment, a dead space is minimized, the occurrence of such disadvantage is restrained to the minimum; uniform mixing treatment can be applied depending upon the type of fluid; and air bubbles of more uniform sizes can be generated.

As described previously, the collecting flow path 26 (see FIG. 15) is formed between the collecting-flow-path forming element 50 and the lead-out side element 60 so that fluid flows from the inflow path 24b to the collecting flow path 26.

The fluid flows into the fluid discharge port 62 (see FIG. 16) through the collecting flow path 26, and then, flows into the flow inlet 32 of the next mixing unit 24B or is led out from the fluid lead-out port 23a of the capping member 23 of a casing.

In the collecting flow path 26, the fluid flows from the outer circumference side to the center side of the collecting-flow-path forming element 50. Guide members 52 are formed at the outer circumferential side of the collecting-flow-path forming element 50; and groove portions 55 are formed between the guide members 52 adjacent to each other. The dimensional widths of the groove portions 55 become constant, and the flow path sectional areas surrounded by the groove portions 55 and the upstream side face 61a of the lead-out side element 60 become constant.

When the flow path sectional area is thus stable, the flow path resistance or pressure is stabilized, and the distribution of fluid is stabilized.

Incidentally, as shown in FIG. 18, a number of so called honeycomb-shaped recessed parts 65 are formed on the upstream side face 61a which is a bottom face of the recessed part 64 of the lead-out side element 60. The abutment face 52c of the guide member 52 of the collecting-flow-path forming element 50 is planar, and therefore, even if a honeycomb recessed part (irregular shape) is present on the abutment face at the side of the lead-out side element 60, fluid is neither diverted nor merged.

However, if a recessed portion 65 is present on the bottom face of the recessed part 64 of the lead-out side element 60, a mixing effect due to a shear force or that due to a mechanical cavitation or the like can be imparted to the fluid in the collecting flow path 26, flowing in the vicinity of an opening of the recessed portion 65.

For example, by employing the lead-out side element 60 provided with a plurality of recessed parts 65 on a surface facing to the collecting flow path 26, a local high-pressure portion or a local low-pressure portion can be generated in the collecting flow path 26 and in the fluid flowing in the vicinity of an opening of the recessed portion 65.

When a local low-pressure portion (for example, a negative pressure portion such as a vacuum portion) is generated in the fluid, a so called foaming phenomenon in which air bubbles are generated in liquid occurs; and there occurs a so called cavitation phenomenon in which: fine air bubbles expands (collapses); and the generated air (air bubbles) break(s) (disappear(s)).

Miniaturization of the substances targeted for mixing is performed by means of a force generated when this cavitation occurs, and fluid mixing is accelerated.

However, as described above, by employing the lead-out side element 60 provided with the recessed portion 65 on the surface facing to the collecting flow path 26, a local high-pressure portion or a local low-pressure portion can be generated in fluid only in place where the opening of the recessed portion 65 of the lead-out side element 60 faces.

In addition, the flow path sectional area is stabilized at another portion, for example, in a region in which fluid leakage is prone to occur, such as the annular outflow path 24a or the vicinity of the inflow path 24b disposed in opposite thereto (see FIG. 15), and a state in which the generation of the local high-pressure portion is prevented is maintained. Therefore, a situation in which fluid leakage is prone to occur is prevented.

As the lead-out side element 60, those of various types can be employed without being limitative to the embodiment in which a plurality of recessed parts have been formed on the bottom face of the recessed part 64. For example, there may be the ones in which: a plurality of protrusive portions are formed on the bottom face of the recessed part 64 in place of the recessed part; both of a plurality of recessed parts and protrusive portions are formed on the bottom of the recessed part 64; and further, the bottom face of the recessed part 64 is planar.

[Static Fluid Mixer of Fourth Embodiment]

Next, a static fluid mixer 10C of a fourth embodiment will be described referring to FIGS. 19 to 21. Like constituent elements of the static fluid mixer 10B of the third embodiment are designated by like reference numerals, and a duplicate description thereof is omitted here.

Unlike the fluid mixer 11B of the third embodiment, in a fluid mixer 11C of the static fluid mixer 100 of the fourth embodiment, a collecting path forming element 50 is not provided as a constituent element of a mixing unit installed in a casing main body 21.

Figure 20:
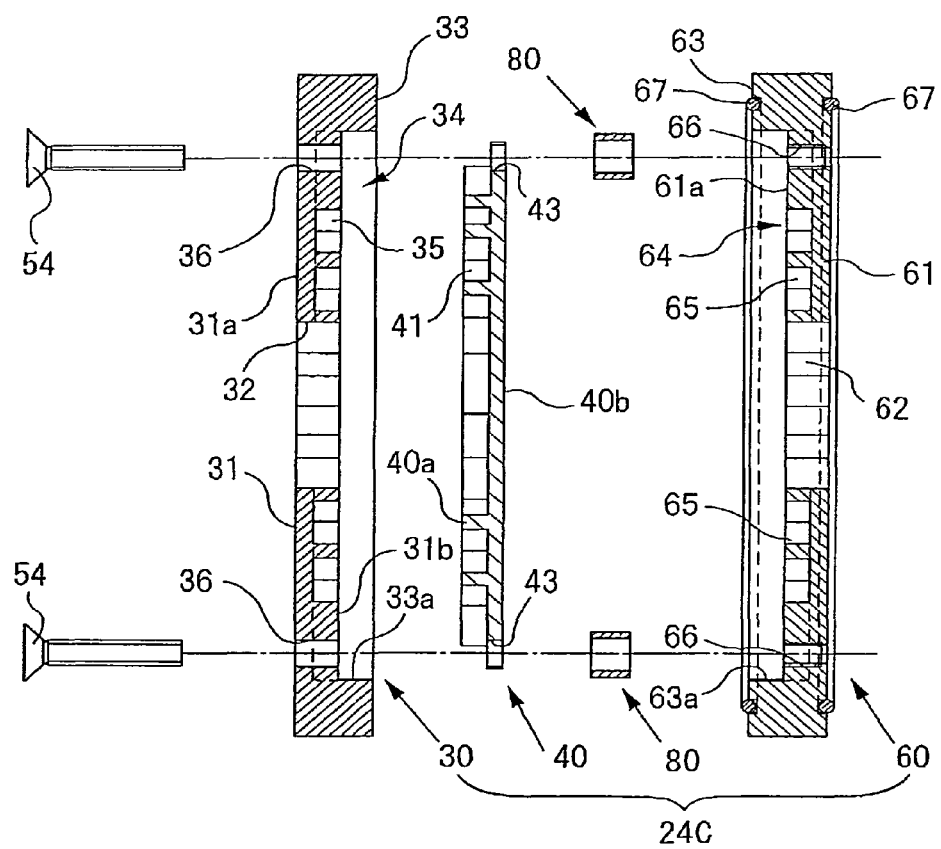
FIG. 20 is an exploded sectional front view showing a mixing unit of the fluid mixer of the fourth embodiment.

Specifically, as shown in FIG. 20, a mixing unit 24C of the fluid mixer 11C of the fourth embodiment is provided with a pair of spacers 80, 80 and a lead-out side element 60 in place of the first mixing element 30, the second mixing element 40, and the collecting-flow-path forming element 50, of the third embodiment.

The spacers 80 each are formed in a cylindrical shape having opening ends at both ends so that: an interval between the second mixing element 40 and the lead-out side element 60, i.e., a flow path depth Z (see FIG. 19) of the collecting flow path 26 which is a flow path forming space formed between the elements 40 and 60 can be appropriately set according to the size of a cylindrical length of the spacer 80; and a change of the flow path depth Z of the collecting flow path 26 can be readily performed by replacing the current spacer with another spacer 80 having an appropriate cylindrical length.

Figure 19:
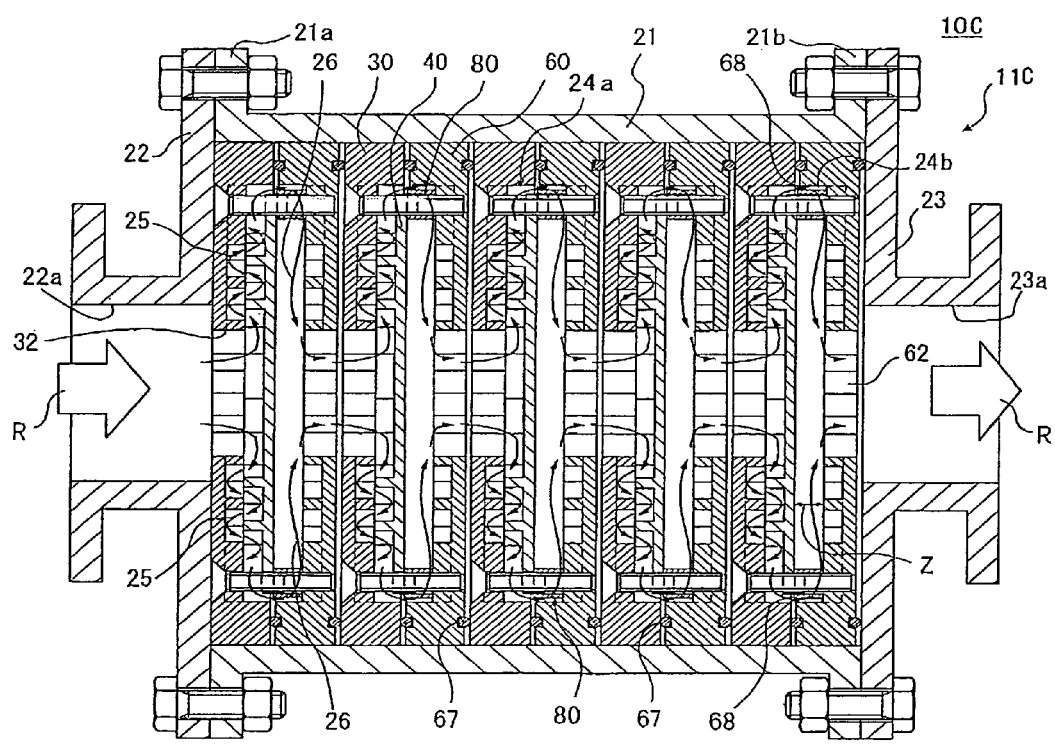
FIG. 19 is a sectional front view showing a fluid mixer of a fourth embodiment.

In addition, the mixing unit 24C is assembled in the states shown in FIGS. 19 to 21.

That is, a state in which the first mixing element 30, the second mixing element 40, and the lead-out side element 60 are assembled with each other is identical to that of the third embodiment; and these elements are assembled by screw-tightening them with screws 54, 54 while through holes 36, 36 of the first mixing element 30, screw holes 43, 43 of the second mixing element 40, opening ends of the pair of spacers 80, 80 and screw holes 66, 66 of the lead-out side element 60 are positionally aligned with each other.

If the spacers 80, 80 are assembled after interposed between the second mixing element 40 and the lead-out side element 60 as described above, an inflow path 24b (see FIG. 19) which is a ring-shaped gap is formed all around the outer circumference between the second mixing element 40 and the lead-out side element 60.

In addition, as shown in FIG. 19, the inflow path 24b for the collecting flow path 26, which is a ring-shaped opening, is disposed at a position opposite to the annular outflow path 24a. Namely, the fluid having flown out of the annular outflow path 24a formed on the outer circumferential edge of the second mixing element 40 directly flows from the ring-shaped inflow path 24b to the collecting flow path 26 formed between the second mixing element 40 and the lead-out side element 60.

With such a structure, a so called dead space in which fluid is prone to stay partway of a flow path for fluid is eliminated. If the dead space is present, fluid is prone to stay in that space, and dispersion in quality of the fluid mixing treatment (the quality such as the size of generated air bubbles, for example) is prone to occur.

In this point of view, in the embodiment, a dead space is minimized so that: the occurrence of the disadvantage is restrained to the minimum; uniform mixing treatment can be applied depending upon the type of fluid; and more uniformly sized air bubbles can be generated. Moreover, in the static fluid mixer 11C, a simple structure and low cost can be achieved in comparison with that of the third embodiment.

As described previously, the collecting flow path 26 (see FIG. 19) is formed between the second mixing element 40 and the lead-out side element 60 so that fluid flows from the inflow path 24b to the collecting flow path 26.

In the collecting flow path 26, the fluid flows from the outer circumferential side to the center side along the rear face of the second mixing element 40; flows into a fluid discharge port 62 (see FIG. 19); and flows into the flow inlet 32 of the next mixing unit 24C, or alternatively, is led out from the fluid lead-out port 23a of the capping member 23 of a casing.

At this time, owing to the employment of the lead-out side element 60 provided with a plurality of recessed parts 65 on a surface facing to the collecting flow path 26, a local high-pressure portion or a local low-pressure portion can be generated in the collecting flow path 26 and in the fluid flowing in the vicinity of an opening of the recessed portion 65.

When a local low-pressure portion (for example, a negative pressure portion such as a vacuum portion) is generated in the abovementioned fluid, there occurs a so called foaming phenomenon that air bubbles are generated in liquid; and there occurs a so called cavitation phenomenon that: fine air bubbles expands (collapses); and the generated air (air bubbles) break(s) (disappear(s)).

Miniaturization of substances targeted for mixing is performed by means of a force generated when this cavitation occurs, and fluid mixing is accelerated.

Figure 22A:
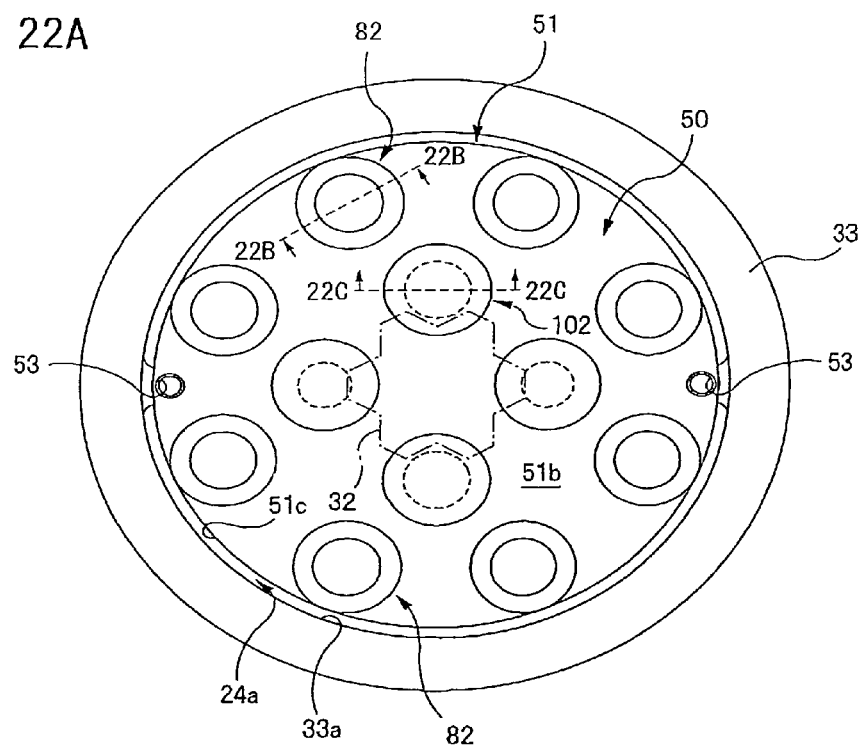
FIG. 22A is a right side explanatory view of an assembling state of the mixing unit showing a modification of a collecting-flow-path forming element.
Figure 22B:
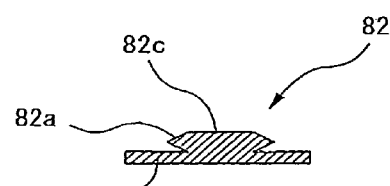
FIG. 22B is a sectional view taken along a line 22B-22B in FIG. 22A.
Figure 22C:
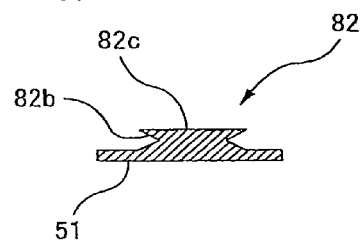
FIG. 22C is a sectional view taken along a line 22C-22C in FIG. 22A.

FIGS. 22A to 22C each show an exemplary modification of a collecting-flow-path forming element 50, wherein complex flow generating members 82 as a number of complex flow generating means are protruded after integrally molded on a downstream side face 51b of an element main body 51, and a collecting flow path 26 is formed between the complex flow generating members 82 adjacent to each other.

The complex flow generating member 82 is formed in a substantially cylindrical shape, as shown in FIGS. 22A to 22C, in the exemplary modification; and a circumferential face serving as a contact face with fluid is formed in the shapes of a protrusive face 82a and a recessed face 82b. The contact face with fluid is formed to be large in size. In addition, a plurality of the complex flow generating members 82 having protrusive faces 82a (eight pieces in the embodiment) are disposed at intervals in the circumferential direction at the circumferential edge part of the element main body 51 at intervals in the circumferential direction at the circumferential edge part of the element main body 51. Further, a plurality of the complex generating members 82 having recessed faces 82b (four pieces in the embodiment) are disposed at positions close to the center part between the complex flow generating members 82, 82 adjacent to each other. Reference numeral 82c designates an abutment face.

In this manner, the mixture fluid flowing from the annular outflow path 24a into the collecting flow path 26 flows along these protrusive face 82a and recessed face 82b; and is formed as a turbulent flow while repeating a complex flow/a pulsating flow so as to flow into the flow inlet 32 and the fluid discharge port 62 of the mixing units adjacent to each other at the downstream side.

The complex flow is a flow of fluid flowing while scrubbing a face of an object, and the complex flow generating means is a protrusive matter having a face for generating the complex flow. In addition, the pulsating flow is the one wherein the flow path sectional area intermittently varies.

Therefore, the complex flow generating member 82 is disposed in the collecting flow path 26, whereby when fluid passes through the inside of the collecting flow path 26, the fluid is formed while the complex flow/pulsating flow is repeated by the presence of the complex flow generating member 82; and a local high-pressure portion or a local low-pressure portion is generated in the fluid.

When a local low-pressure portion (for example, a negative pressure portion such as a vacuum portion) is generated in the fluid, a so called foaming phenomenon occurs in which air bubbles are generated in liquid; and there occurs a so called cavitation phenomenon in which: fine air bubbles expands (collapses); and the generated air (air bubbles) break(s) (disappear(s)).

Miniaturization of substances targeted for mixing is performed by means of a force generated when this cavitation occurs, and fluid mixing is accelerated.

As described previously, if a fluid high-pressure portion is locally generated at or near a position at which the leakage of fluid is prone to occur, the leakage of the fluid is prone to occur, and thus, in that sense, it is not preferable that the local high-pressure portion be generated.

However, as described above, the complex flow generating member 82 is disposed in the collecting flow path 26, whereby, among the flow paths from the flow outlet to the flow inlet 32 and or to the discharge port 62, a local high-pressure portion or a local low-pressure portion can be generated in the fluid at only a site at which the complex flow generating member 82 is disposed; and fluid mixing is accelerated.

In addition, while, in the embodiment, both of the complex flow generating members 82 having the protrusive and recessed faces 82a and 82b are provided in the element main body 51, only either one of these members 82 can be provided in the element main body 51. The shape of the complex flow generating means may be any shape of forming a complex flow, and is not limitative to the substantially cylindrical shape of the embodiment.

[Explanation of Performance Evaluation of the Static Fluid Mixer of the Embodiment]

Next, an evaluation result of performance of the static fluid mixer of the embodiment will be described.

Here, the sizes of air bubbles included in air bubbles-containing water treated by means of the static air bubbles generator were measured by employing the static fluid mixer as a static air bubble generator, and based upon the measured sizes of the air bubbles, the performance of the static fluid mixer was evaluated.

Example 1

The basic configuration of the static air bubble generator employed in this example was common to that of the static air bubble generator of the second embodiment.

Specifically, the static air bubble generator employed in this example was provided with eight sets of mixing units in a casing main body, unlike the static air bubble generator of the second embodiment. The other constituent elements were similar to those of the second embodiment. The mixing unit was 107 mm in diameter and was made of stainless.

Air bubbles-containing water employed in evaluation of Example 1 was obtained by activating such static air bubble generator. At this time, the gas-liquid mixture fluid supplied to the static air bubble generator was made of water and air, the water was general tap water, and the water temperature was 14 degrees Centigrade.

A bulk ratio (atmospheric pressure state) of the air in the mixture fluid was about 3%. The number of times of the supplied gas-liquid mixture fluid having passed through the fluid mixer was one time. In addition, a supply pressure of the gas-liquid mixture fluid was 1.0 MPa.

At this time, the treatment quantity of the fluid mixer was about 20 litters per minute, and the discharge pressure of the water at the fluid lead-out port of the fluid mixer was about 0.4 MPa.

When 30 seconds had passed after start of the activation, the treated water led out from the fluid lead-out port was sampled as evaluation water.

Comparative Example 1

Figure 23:
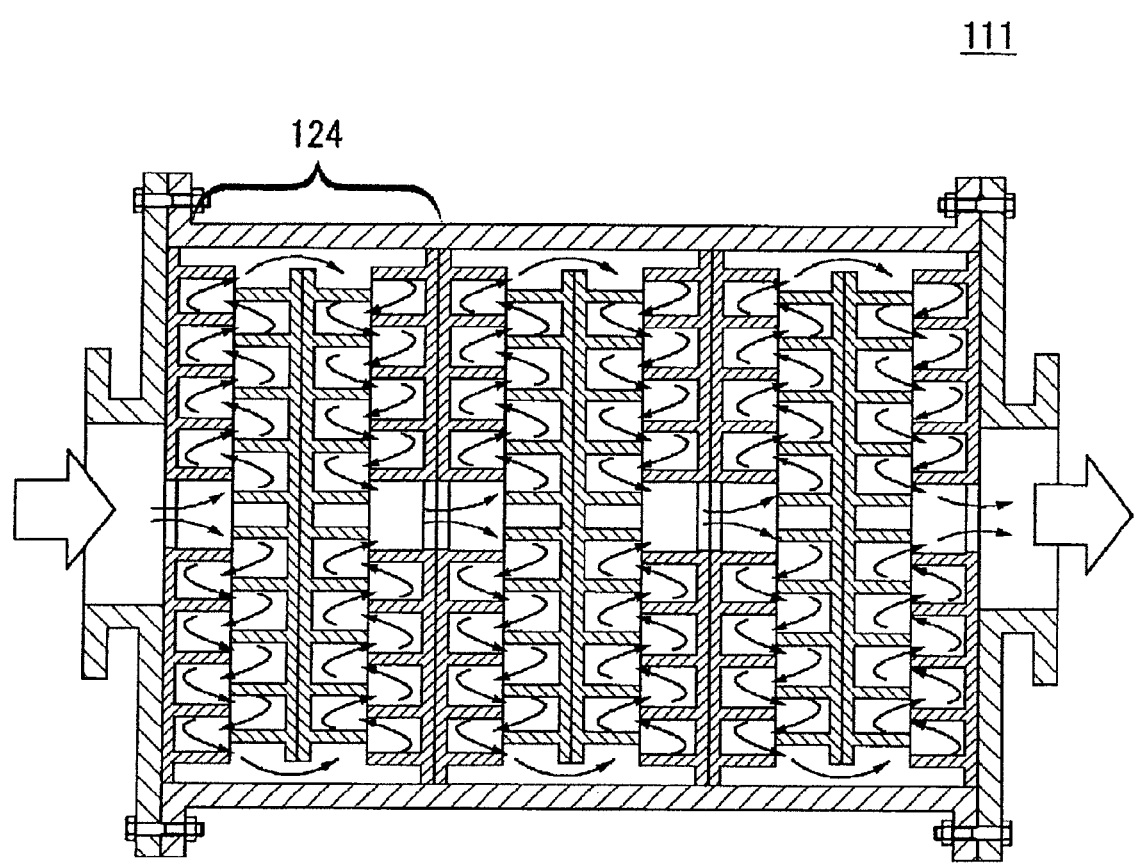
FIG. 23 is sectional front view showing a fluid mixer of a static air bubble generator employed in a Comparative Example 1.

A conventional static air bubble generator employed in this comparative example was provided with a fluid mixer 111 shown in FIG. 23.

Namely, a mixing unit 124 of the fluid mixer 111 was schematically provided with: a mixture flow path adapted to flow fluid in a radial direction from its center to its outer circumference; and a collecting flow path adapted to flow the fluid having flown in the outer circumference to the center again, and both of these flow paths were formed by abutting abutment faces having honeycomb-shaped irregularities.

The constituent elements of the fluid mixer 111 were similar to those of the fluid mixer of Example 1 except that the states of the flow paths of the mixing unit are different from each other.

The air bubbles-containing water employed in evaluation of Comparative Example 1 was obtained by activating such conventional static air bubble generator.

At this time, the supply pressure of the gas-liquid mixture fluid was 1.0 MPa, and the discharge pressure was about 0.4 MPa, both of which were substantially identical to those of Example 1, whereas the treatment quantity of the fluid mixer was about 15 litters per minute. Other than these conditions, they are identical to those of Example 1. In addition, like Example 1, when 30 seconds had passed after start of the activation, the treated water led-out from the fluid lead-out port was sampled as evaluation water.

The sizes of air bubbles contained in the thus sampled treated water were measured by employing a laser diffraction particle size measuring instrument (SALD-2000A available from Shimadzu Corporation). The measurement result is shown in FIGS. 24A and 24B.

Figure 24A:
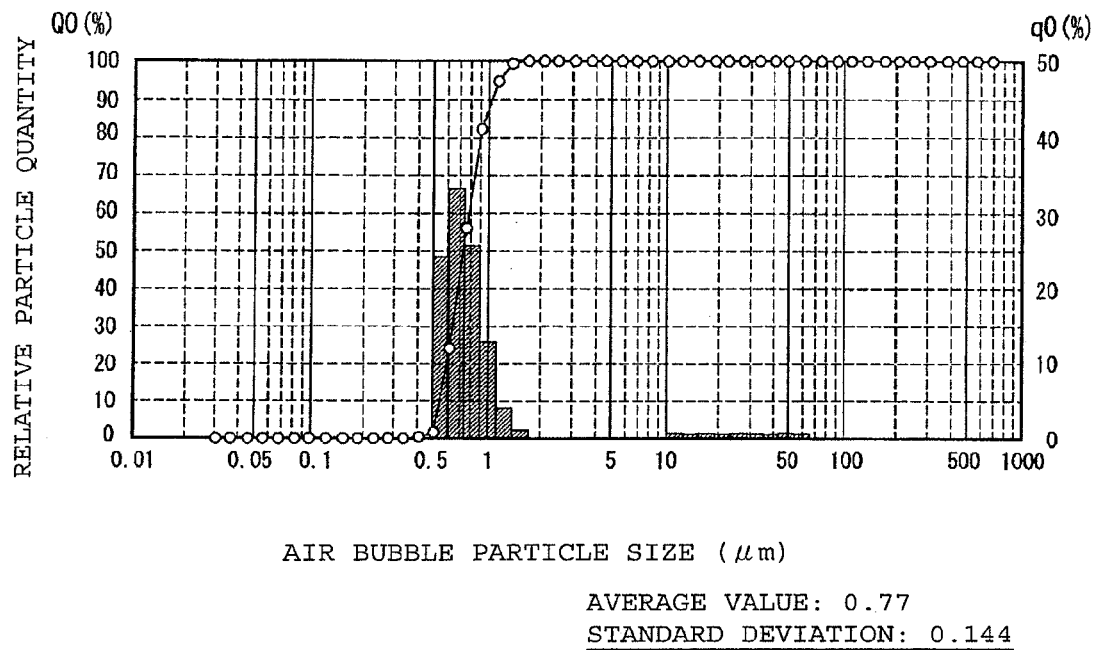
FIG. 24A is a graph depicting a measurement result of sizes of air bubbles contained in treated water of Example 1.

As depicted in the graph of FIG. 24A, in Example 1, almost of the air bubbles contained in the treated water were 1 microns or less in their particle sizes. Almost of the air bubbles were 0.5 micron to 1.0 micron in their particle sizes, and were uniform.

Figure 24B:
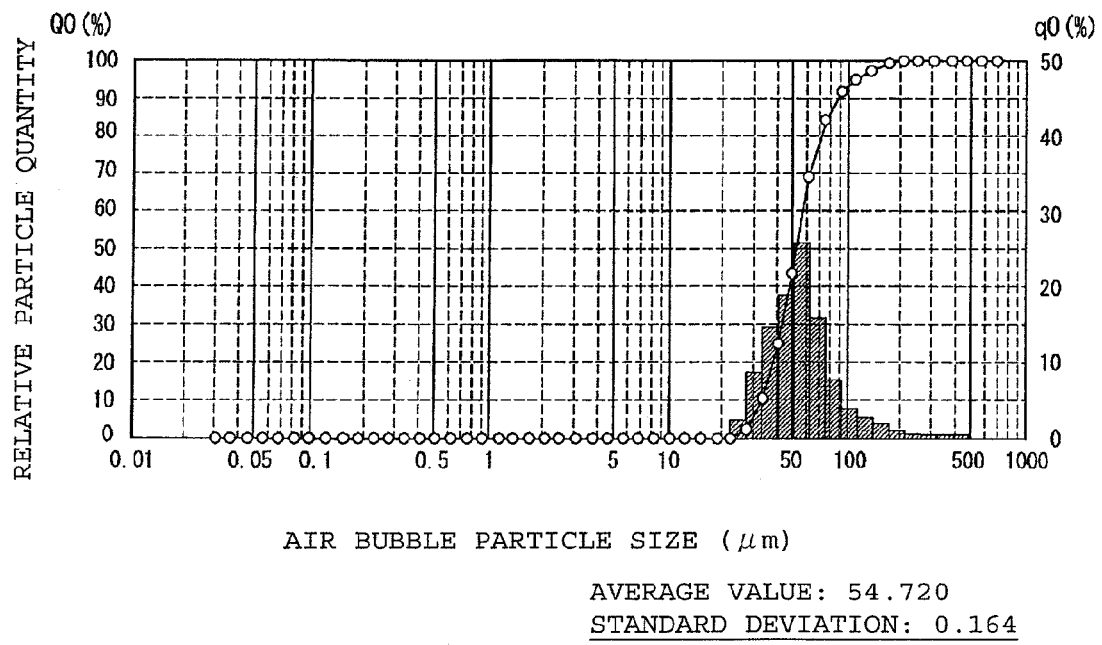
FIG. 24B is a graph depicting a measurement result of sizes of air bubbles contained in treated water of Comparative Example 1.

On the other hand, as shown in FIG. 24B, in Comparative Example 1, almost of the air bubbles were 30 microns or more. The air bubble particle sizes were found between 30 microns and 100 microns, and varied widely.

By virtue of such measurement result, it was found that the static air bubble generator of the embodiment has superior performance that air bubbles of very small particle sizes can be generated, and moreover, has superior performance that air bubbles of uniform particle sizes can be generated. In addition, it was thereby found that the static fluid mixer of the embodiment has its very superior fluid mixing capacity.

While several embodiments of the static fluid mixer have been described so far, various modifications can be made without being limitative thereto.

For example, while, in the static fluid mixer of each of the embodiments, the openings of recessed parts 35, 41 were formed in the shapes of regular hexagons, they may be formed in the shapes of triangles such as regular triangles, rectangles such as regular tetragon, or octagons such as regular octagons without being limitative thereto.

Figure 25:
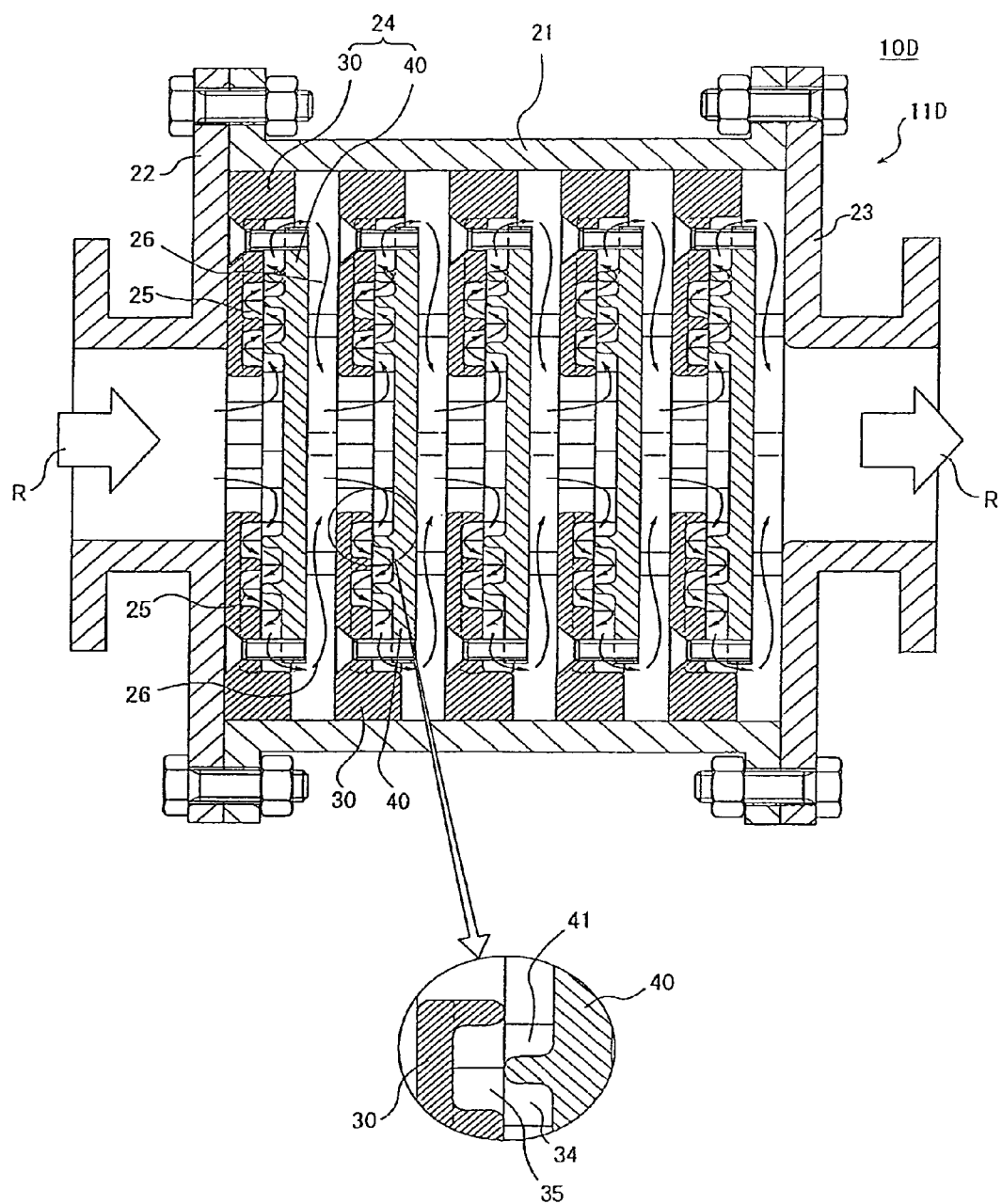
FIG. 25 is a sectional front view showing a modified example of the fluid mixer of the first embodiment.

In addition, as shown in FIG. 25, among constituent elements of the mixing unit 24, rectangular parts of portions which are in contact with treated fluid may be rounded into be smooth faces. For example, as shown in the partial enlarged view of FIG. 25, a rectangular part of an opening end of a recessed part 35 formed in a recessed part 34 of the first mixing element 30 may be rounded and smoothened.

Further, a corner part of the portion which is in contact with the treated fluid may be a rounded smooth face. For example, as shown in the partial enlarged view of FIG. 25, the corner part of a bottom face of the recessed part 35 formed in the recessed part 34 of the first mixing element 30 may be rounded and smoothened.

By way of such rounding and smoothing, a flow path resistance decreases and the treatment quantity per unit time can be increased.

By way of rounding the corner part, a dead space decreases, the fluid can be uniformly mixed, and fluid mixing treatment performance can be improved. For example, air bubbles of more uniform sizes can be generated, and variation in sizes of air bubbles generated can be reduced more remarkably.

While the fluid mixer 11D of FIG. 25 is modification of the fluid mixer 11 of the first embodiment, it may be modification of the fluid mixer 11A, 11B, or 11C of the second, third, or fourth embodiment, likewise.

Figure 26:
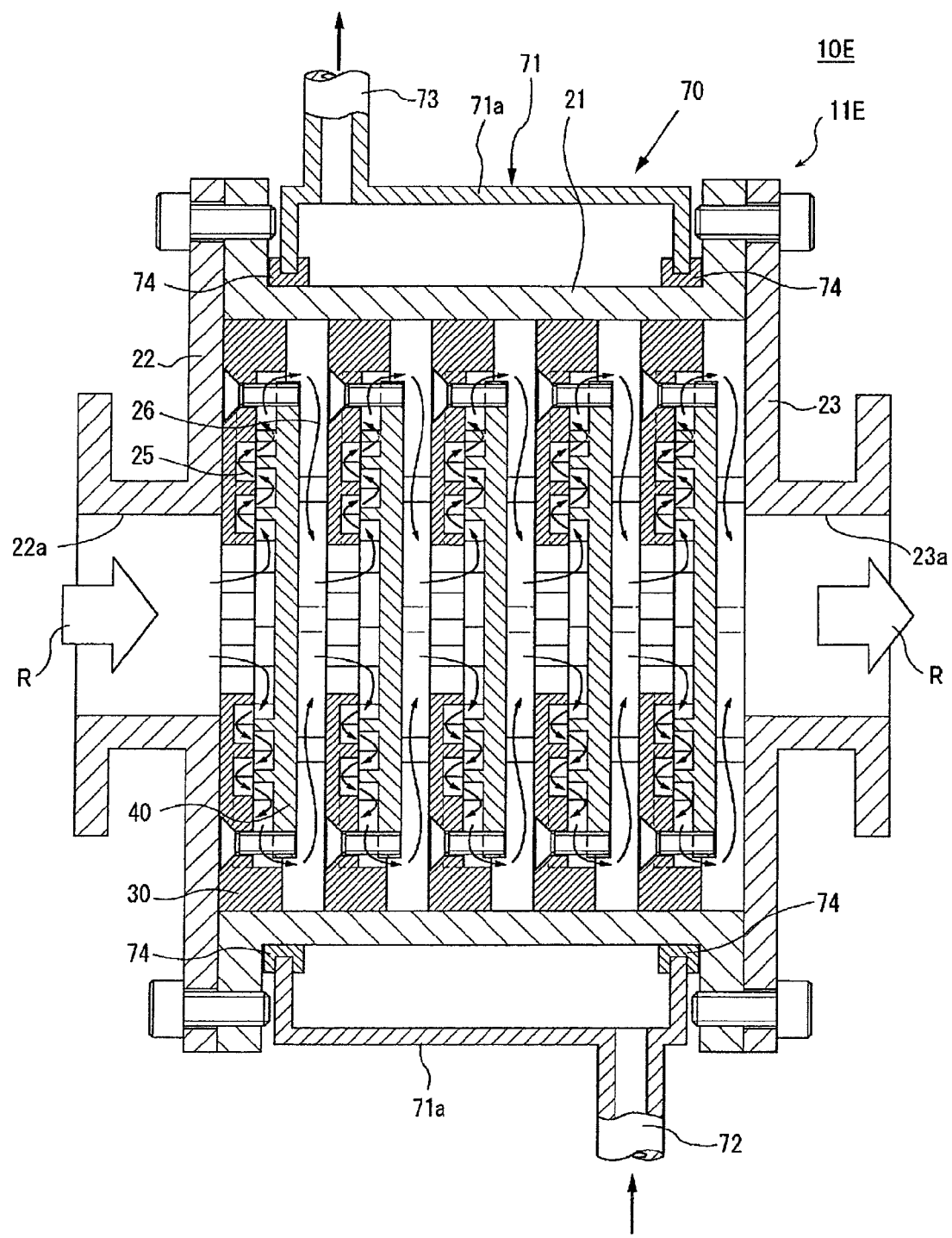
FIG. 26 is a sectional front view showing another modified example of the fluid mixer of the first embodiment.

In addition, as shown in FIG. 26, a temperature control unit 70 may be installed in a fluid mixer 11E. The temperature control unit 70 is provided with: a jacket part 71 covering an outer circumference of the casing main body 21 of the fluid mixer 11E; a water supply pipe 72 connected to a water supply pump (not shown) for supplying fluid (water) for temperature control in the jacket 71; and a drainage pipe 73 for leading out the water from the jacket 71.

The jacket part 71 is made by assembling divisional jacket members 71a, 71a formed in a semi-cylindrical shape, so as to be removably mounted to the casing main body 21. In addition, a packing 74 is mounted to a contact part with the casing main body 21 of the jacket part 71, so as to prevent leakage of the water for temperature control.

As long as such temperature control unit 70 is installed, when an attempt is made to prevent a temperature rise of the fluid targeted for fluid mixing treatment (for example, gas-liquid mixture fluid targeted for air bubble generation treatment), the temperature rise of the treatment fluid can be readily prevented by supplying cooling water to the jacket. While the fluid mixer 10E of FIG. 26 is modification of the fluid mixer 11 of the first embodiment, it may be modification of the fluid mixer 11A, 11B, 11C, or 11D of another embodiment, likewise.

In addition, while the temperature control unit shown in FIG. 26 performs temperature control such as cooling by employing coolant such as cooling water, a variety of methods such as a method of providing a heat radiation fin in casing, for example, can be enumerated without being limitative thereto.

Further, a fluid introducing pipe 13 as a liquid supply pipe for supplying a liquid targeted to be reformed is connected to the flow inlet 32 of the static fluid mixer, whereby the static fluid mixer can be employed as a static liquid reforming treatment device. The liquids targeted to be reformed can include a variety of liquids such as water, for example.

According to the static liquid reforming treatment device, mixing treatment can be applied to the liquid targeted to be reformed, at a high speed; and therefore, the liquid can be reformed. For example, water does not generally exist in a single molecule, but forms a cluster made of a plenty of molecules; and therefore, if water is treated by means of the static liquid reforming treatment device, reformed water with its smaller cluster size can be obtained.

The reformed water with its smaller cluster size is improved in solubility at the time of dissolving a water-soluble substance, and is improved in permeability in that it is more easily absorbed in digestive canal or it is easily taken in intra-body cells.

In addition, a fluid introducing pipe 13 as an aqueous fluid supply pipe, for supplying aqueous fluid including at least any one component of protein, amino acid, carbohydrate, glycoprotein, and lipid and water content, is connected to the flow inlet 32 of the static fluid mixer, whereby the static fluid mixer can be employed as a static aqueous fluid mixer.

The static aqueous fluid mixer is capable of treating a variety of fluids including at least one component of water and protein, amino acid, carbohydrate, glycoprotein, and lipid, such as a liquid including water and a royal jelly, for example.

According to the static aqueous fluid mixer, mixing treatment is applied to the fluids targeted for mixing, whereby the fluids can be uniformly mixed with each other, and so called emulsification can be performed.

In this manner, a cream-like or emulsion-like mixture can be produced. For example, in the case where the target for mixing is a mixture of water and a royal jelly, if this mixture is treated by means of the static aqueous fluid mixer, a polymeric component such as glycoprotein included in a royal jelly is miniaturized and uniformized, and an emulsified target for mixing is obtained.

In addition, a fluid introducing pipe 13 as a solid-liquid mixture liquid supply pipe, for supplying a solid-liquid mixture fluid with a solid and a liquid being mixed with each other, is connected to the flow inlet 32 of the static fluid mixer, whereby the static fluid mixer can be employed as a static solid-liquid mixture mixer.

A variety of solid-liquid mixture fluids can include: a solid-liquid mixture fluid including, as a solid matter, sea weeds such as brown alga containing fucoidan; a solid-liquid mixture fluid including, as a solid matter, sea weeds such as brown alga such as Laminaria japonica, Hijiki, or Nemacystus decipiens including alginic acid; a solid-liquid mixture fluid including, as a solid matter, mushrooms or analogous including β-glucan; a solid-liquid mixture fluid including, as a solid matter, Korean ginseng or Tienchi ginseng including ginsenoside; a solid-liquid mixture fluid including, as a solid matter, garlic including alliin or allicin; a solid-liquid mixture fluid including, as a solid matter, soy beams including isoflavone; a solid-liquid mixture fluid including, as a solid matter, ginger including gingelol; a solid-liquid mixture fluid including, as a solid matter, aloe including aloin; a solid-liquid mixture fluid including, as a solid matter, curcuma including curcumin; a solid-liquid mixture fluid including, as a solid matter, other vegetables or fruits; and a solid-liquid mixture fluid made of fine particle such as powder and water, for example.

According to the static solid-liquid mixer, mixing treatment is applied to the fluid targeted for mixing, whereby a solid component such as solid particles and a liquid component such as water are miniaturized, both of which can be uniformly mixed with each other and can be dispersed.

FIELD OF INDUSTRIAL APPLICABILITY

The static fluid mixer according to the present invention is capable of ultra-miniaturizing and uniformizing: a liquid and a liquid; a liquid and a gas such as oxygen; a liquid targeted to be reformed, such as water; a liquid and an aqueous water such as a royal jelly; and a solid such as a see weed and a liquid, and is capable of improving a quality of fluid. Therefore, the mixer is applicable in a wide variety of industrial fields.

The invention claimed is:

1. A static fluid mixer capable of ultrafinely mixing fluids, the static fluid mixer comprising:
a plurality of diverting parts adapted to dispose a plate-shaped second mixing element to be opposed to a plate-shaped first mixing element forming a flow inlet of a fluid at a center part thereof and to allow the fluid having flown from the flow inlet to be flown and diverted in a radiation direction; and a plurality of confluence parts adapted to flow and converge in a radiation direction the fluid having been diverted at the diverting parts, and
wherein the mixing unit is provided with a flow outlet for flowing the fluid having passed through the mixing flow path,
wherein: the first mixing element integrally forms a circumferential wall part in a protrusive shape all over an entire circumference, at a circumferential edge part of one side face of an element main body formed in a plate shape, forming a recessed part by the circumferential wall part and the element main body;
the second mixing element is disposed to be face-to-face opposed to the element main body in the recessed part, allowing an annular outflow path opening in a ring shape to be formed at substantially predetermined intervals all over an entire circumference, between an inner circumference face of a circumferential wall part of the first mixing element and an outer circumference end face of the second mixing element, a trailer opening of the annular outflow path being formed as a flow outlet, constituting a mixing unit;
the mixing unit is disposed in plurality at intervals in an axial direction in a cylindrical casing main body, allowing an inner circumferential face of the casing main body to be brought into contact with facial intimate contact with an outer circumferential face of the circumferential wall part of the first mixing element, allowing a flow path forming space communicating with the annular outflow path to be formed by mixing units adjacent to each other and the casing main body; and
a collecting flow path is formed in the flow path forming space so that the fluid having passed through the mixing flow path flows out equally from the entire circumference of the flow outlet opening in the ring shape, and then, flows and gathers to an axial core side of the casing main body, in which
in the flow path forming space, a plurality of guide members stabilizing a flow path sectional area are arranged in vicinity of a flow outlet opening in a ring shape and at an axial core side of a casing main body, allowing the guide members to be disposed at intervals in a circumferential direction along a flow outlet, thereby forming a collecting flow path between the guide members adjacent thereto, whereas forming an annular communication path extending in a circumferential direction along an inner circumferential face side of the casing main body;
a leader part of the collecting flow path is connected to an inner circumferential face part of the annular communication path, allowing the collecting flow path to communicate with the flow outlet via the annular communication path;
a mixing unit disposes and constitutes a collecting-flow-path forming element at a rear side of a second mixing element, and the collecting-flow-path forming element forms an extensive guide member stabilizing a flow path sectional area on one side face of an element main body;
a plurality of mixing units are disposed at intervals in an axial direction in a casing main body formed in a cylindrical shape, allowing first and second mixing elements and a collecting flow path forming element, constituting the mixing units, to be formed in a disk shape;
a guide member provided in the collecting-flow-path forming element is formed, in a substantially arc-shaped flat shape, of an outer circumferential arc face formed on an arc face having a same curvature as that of an outer circumferential edge of an element main body, a pair of side faces connected to be extended from both ends of the outer circumferential arc face to a center side of the element main body, and an abutment face formed as a flat face parallel to the element main body; and
the guide body is disposed in plurality at equal intervals in a circumferential direction at a circumferential part of the element main body, and is formed so that: an outer circumferential arc face of each of the guide members is flush with an outer circumferential end face of the collecting-flow-path forming element and an outer circumferential end face of the second mixing element; and side faces opposite to each other, of the adjacent guide members, are parallel to each other in a circumferential direction, allowing a groove part width of a groove part, which is formed of a side face of an adjacent guide member and a rear face of the element main body, to be substantially equal from a circumferential side to a center side of the collecting-flow-path forming element.

2. A static air bubble generator, wherein a gas-liquid mixture fluid supply pipe for supplying a gas-liquid mixture fluid with a gas and a liquid being mixed with each other is connected to the flow inlet of the static fluid mixer capable of ultrafinely mixing fluids set forth in claim 1.

3. The static air bubble generator set forth in claim 2, wherein the gas to be mixed is oxygen.

4. A static liquid reforming treatment device, wherein a liquid supply pipe for supplying a liquid targeted to be reformed is connected to the flow inlet of the static fluid mixer capable of ultrafinely mixing fluids set forth in claim 1.

5. A static water reforming treatment device, wherein the liquid targeted to be reformed, set forth in claim 4, is water.

6. A static aqueous fluid mixer, wherein an aqueous fluid supply pipe for supplying an aqueous fluid including at least one component of protein, carbohydrate, glycoprotein, and lipid, and water content is connected to the flow inlet of the static fluid mixer capable of ultrafinely mixing fluids set forth in claim 1.

7. The static aqueous fluid mixer set forth in claim 6, wherein the aqueous fluid includes a royal jelly.

8. A static solid-liquid mixer, wherein a solid-liquid mixture fluid supply pipe for supplying a solid-liquid mixture fluid with a solid and a liquid being mixed with each other is connected to the flow inlet of the static fluid mixer capable of ultrafinely mixing fluids set forth in claim 1.

9. The static solid-liquid mixer set forth in claim 8, wherein the solid-liquid mixture fluid includes a sea weed containing fucoidan.

\* \* \* \* \*